US010655551B2

(12) United States Patent
Shawe et al.

(10) Patent No.: US 10,655,551 B2
(45) Date of Patent: May 19, 2020

(54) DRIVE ARRANGEMENT FOR AN ENGINE ANCILLARY SUCH AS A SUPERCHARGER

(71) Applicant: ALLISON TRANSMISSION, INC., Indianapolis, IN (US)

(72) Inventors: James Shawe, Lancashire (GB); John Fuller, Lancashire (GB)

(73) Assignee: ALLISON TRANSMISSION, INC., Indianapolis, IN (US)

( * ) Notice: Subject to any disclaimer, the term of this patent is extended or adjusted under 35 U.S.C. 154(b) by 217 days.

(21) Appl. No.: 14/767,681

(22) PCT Filed: Feb. 13, 2014

(86) PCT No.: PCT/EP2014/052859
§ 371 (c)(1),
(2) Date: Aug. 13, 2015

(87) PCT Pub. No.: WO2014/125047
PCT Pub. Date: Aug. 21, 2014

(65) Prior Publication Data
US 2015/0345413 A1 Dec. 3, 2015

Related U.S. Application Data

(63) Continuation-in-part of application No. PCT/EP2014/000247, filed on Jan. 10, 2014, which is
(Continued)

(30) Foreign Application Priority Data

Feb. 13, 2013 (GB) .................................. 1302544.0

(51) Int. Cl.
*F16H 13/04* (2006.01)
*F16H 15/04* (2006.01)
(Continued)

(52) U.S. Cl.
CPC .......... *F02D 41/0007* (2013.01); *F02B 33/34* (2013.01); *F02B 39/04* (2013.01);
(Continued)

(58) Field of Classification Search
CPC .......... F16H 13/04; F16H 15/04; F16H 15/08; F16H 15/10; F16H 61/6648; F02D 41/007; F02D 41/1401; F02B 39/04
(Continued)

(56) References Cited

U.S. PATENT DOCUMENTS 3,394,617 A 7/1968 Dickenbrock
4,530,338 A * 7/1985 Sumi ..................... F02B 39/12
123/198 R
(Continued)

FOREIGN PATENT DOCUMENTS

CN 86105593 1/1987
CN 86105887 2/1987
(Continued)

OTHER PUBLICATIONS

International Search Report; related International application No. PCT/EP2014/052859; dated Jul. 7, 2014.
(Continued)

*Primary Examiner* — Deming Wan
(74) *Attorney, Agent, or Firm* — Taft Stettinius & Hollister LLP; Stephen F. Rost

(57) ABSTRACT

A supercharging arrangement for an internal combustion engine. The supercharging arrangement comprises a supercharger having a rotational drive input, and a transmission having a rotational drive input to receive drive from an internal combustion engine, and a rotational drive output connected to the input of the supercharger. The transmission includes a variator operatively connected between the input and the output of the transmission, which variator has an
(Continued)

output that is driven at an operating ratio from an input. A control system operates to cause an engine to deliver an amount of torque that is indicated by the state of an input to the control system. The control system is further operative to set the operating ratio of the variator.

19 Claims, 14 Drawing Sheets

Related U.S. Application Data a continuation-in-part of application No. PCT/EP2014/000051, filed on Jan. 10, 2014.

(51) Int. Cl.
| | |
|---|---|
| *F16H 13/08* | (2006.01) |
| *F16H 13/10* | (2006.01) |
| *F02B 39/04* | (2006.01) |
| *F02D 41/14* | (2006.01) |
| *F16H 15/38* | (2006.01) |
| *F02D 41/00* | (2006.01) |
| *F16H 61/664* | (2006.01) |
| *F02B 33/34* | (2006.01) |
| *F02B 39/16* | (2006.01) |

(52) U.S. Cl.
CPC ......... *F02D 41/1401* (2013.01); *F16H 15/38* (2013.01); *F16H 61/6648* (2013.01); *F02B 39/16* (2013.01); *Y02T 10/144* (2013.01)

(58) Field of Classification Search
USPC .................................................. 123/559.3
See application file for complete search history.

(56) References Cited

U.S. PATENT DOCUMENTS

| | | | |
|---|---|---|---|
| 4,745,755 A | 5/1988 | Kawamura | |
| 4,833,887 A | 5/1989 | Kawamura et al. | |
| 5,707,313 A * | 1/1998 | Suzuki | F16H 61/6648 476/10 |
| 6,217,477 B1 * | 4/2001 | Nobumoto | B60W 10/06 477/107 |
| 6,658,338 B2 * | 12/2003 | Joe | F16H 61/6648 476/41 |
| 2010/0267510 A1 | 10/2010 | Nichols et al. | |
| 2012/0000446 A1 | 1/2012 | Venton-Walters et al. | |
| 2013/0017923 A1 | 1/2013 | Park et al. | |
| 2013/0017925 A1 * | 1/2013 | Burtt | F16H 15/38 476/40 |

FOREIGN PATENT DOCUMENTS

| | | |
|---|---|---|
| JP | 1987142822 A | 6/1987 |
| JP | 1991141826 A | 6/1991 |
| JP | 1994346949 A | 12/1994 |
| JP | 2006322425 A | 11/2006 |
| JP | 2010505074 A | 2/2010 |
| JP | 2010519482 A | 6/2010 |
| JP | 2011517483 A | 6/2011 |
| WO | 2008002457 A2 | 1/2008 |
| WO | 2008102168 A1 | 8/2008 |
| WO | 2011064572 A2 | 6/2011 |

OTHER PUBLICATIONS

European Office Action; European Patent Office; European Patent Application No. 14710198.4; dated Jun. 13, 2018; 5 pages.
Chinese Office Action; Chinese Patent Office (State Intellectual Property Office of People's Republic China; Chinese Patent Application No. 201480008740.8; dated Apr. 11, 2019; 3 pages.
International Preliminary Report on Patentability issued in connection with Application No. PCT/EP2014/000247, dated Jul. 14, 2015, 5 pages.
Japanese Office Action; Japan Patent Office; Japan Patent Application No. 2015-556540; dated Nov. 7, 2017; 6 pages.
Indian Office Action; Intellectual Property India; Indian Patent Application No. 7063/DELNP/2015; dated Sep. 17, 2019; 6 pages.
Japanese Office Action; Japan Patent Office; Japanese Patent Application No. 2018-231544; dated Nov. 19, 2019; 6 pages.

* cited by examiner

DRIVE ARRANGEMENT FOR AN ENGINE ANCILLARY SUCH AS A SUPERCHARGER

CROSS REFERENCE TO RELATED APPLICATIONS

This application is the U.S. national phase of PCT Application No. PCT/EP2014/052859 filed Feb. 13, 2014 which claims priority to GB 1302544.0 filed Feb. 13, 2013; PCT/EP2014/000247 filed Jan. 10, 2014; and PCT/EP2014/000051 filed Jan. 10, 2014. The disclosures of these cases are incorporated in their entirety by reference herein.

BACKGROUND OF THE INVENTION

(1) Field of the Invention

The present invention relates to a drive arrangement for an engine auxiliary drive. It has particular, but not exclusive, application to a drive arrangement for a supercharger or other device in which drive is transmitted from an internal combustion engine to a supercharger through a drive system that includes a continuously-variable transmission (CVT).

The invention has particular application to passenger cars and light road vehicles. While this is not the only application of the invention, this application will be used as a basis for description of how the invention might be implemented. In this regard, embodiments of the invention will typically be used on an engine that is controlled by a driver using a foot pedal that allows a driver to control the amount of torque that the engine will generally cause to be delivered to the vehicle's transmission. In the case of a petrol engine, this pedal will directly or indirectly control the position of a throttle that regulates flow of air into the engine, while in the case of a diesel engine, the pedal will directly or indirectly control the amount of fuel that will be injected into the engine. Therefore, in this specification, the commonly-used term "accelerator pedal" will be used to refer generally to such a pedal independently of its actual, physical effect on the operation of the engine.

(2) Description of Related Art

Forced induction is seen as making an important contribution to improving the efficiency of internal combustion engines, resulting in reduced carbon dioxide emissions. In particular, superchargers driven from the engine (as contrasted with exhaust-driven turbochargers) can offer a considerable degree of control over the amount of air and hence fuel entering the engine at any given time, which in turn can offer improved control of engine power and driving response in combination with reduced exhaust emissions.

In general, the rotational speed at which the supercharger must be driven is greater than the rotational speed of the crankshaft of the engine by a large factor. For example, a typical petrol engine for a passenger car will operate at speeds between 750 and 6000 rpm, while a centrifugal supercharger might be required to operate at between 40 000 and 250 000 rpm. Hitherto, this has typically been achieved by providing a step-up gear train of fixed ratio between the crankshaft and the supercharger.

It is apparent that causing the supercharger to be driven at a fixed multiple of the crankshaft speed is not optimal. If the supercharger system is configured to deliver the maximum possible engine torque at low engine speed then the power is wasted at high engine speed. If the supercharger system is configured such that it supplies the required engine torque at high engine speed then engine torque at low engine speed may be insufficient. It is clear that providing a variable ratio drive between the crankshaft and the supercharger could be used to reduce the amount of wasted energy that is delivered to the supercharger whilst maximising engine torque output at low engine speeds, and that a continuously-variable ratio drive has clear advantages over a step-change ratio drive.

Consider now the situation where an engine is operating to drive a vehicle at substantially steady speed using a small percentage of the engine's available torque, and the driver suddenly depresses the accelerator pedal, for example to overtake a slower vehicle. Ideally, the supercharger would be accelerated to its maximum speed in as short a time as possible to answer the driver's request for maximum engine torque. In response to such a demand, if a variable-ratio drive is immediately swept from a low to a high ratio, a substantial part of the output torque of engine might be required just to accelerate the supercharger, and will therefore be unavailable to accelerate the vehicle. Without proper control, it is possible to imagine a situation where so much torque is absorbed by the supercharger drive, a sudden accelerator pedal input could actually result in a transient reduction in the torque delivered to the driving wheels. This is highly undesirable.

A continuously-variable transmission system incorporating a variator that is torque-controlled might provide a straightforward solution to this control problem. Such variators are well known to those skilled in the technical field, an example being disclosed in WO-A-2004090382, and are typically, but not exclusively, of the toroidal traction drive type. The control input to the transmission can control the torque that will be delivered to the supercharger, and this can be set to a predetermined maximum, or a proportion (that could be fixed or variable) of the total current engine torque, thus ensuring that the net output torque of the engine is sufficient to meet the driver's request. However, torque-controlled variators generally require effort to be applied to their torque transmission elements with the result that control components such as control actuators are generally comparatively large and costly. Whilst this does not present a problem on larger systems such as main drive commercial vehicle transmissions, use of torque-controlled systems in low power applications can result in disproportionately high actuator power consumption. Therefore, while a torque-control transmission might be desirable for control purposes, it may not provide an acceptable solution where cost and weight must be kept to an absolute minimum, for example on variable-speed front engine auxiliary drives (FEAD) such as oil pumps, alternators, superchargers, water pumps, power steering devices, and auxiliary fan drives.

BRIEF SUMMARY OF THE INVENTION

The aim of this invention is to provide an arrangement whereby a front-engine ancillary such as a supercharger can be driven through a continuously-variable transmission from an internal combustion engine that is capable of providing the required degree of control for effective operation while keeping cost, weight and complexity to a minimum.

To this end, from a first aspect this invention provides a supercharging arrangement for an internal combustion engine comprising:
  a supercharger having a rotational drive input;
  a transmission having a rotational drive input to receive drive from an internal combustion engine, and a rotational drive output connected to the input of the supercharger; wherein the transmission includes a variator operatively connected between the input and the output of the transmission, which variator has an output that is driven at an operating ratio from an input, and control means for setting the operating ratio of the variator in which the control system operates to cause an engine to adopt an operating condition that is indicated by the state of an input to the control system, and the control means is operative to set the operating ratio of the variator.

In arriving at this invention, the inventors realised that the disadvantages of operation of the variator under ratio control, as compared with the clearly preferable torque control, can be overridden by the savings in cost and weight that are achieved by the comparative simplicity and low power required to operate certain ratio control implementations. Operation under torque-control allows simple implementation of a control system (all it must do is set a limit on the torque that will be applied to the engine or the supercharger) whereas ratio control presents a considerably greater technical challenge.

In general, the control system must operate to cause the engine to adopt an operating condition that is indicated by states of one or more inputs to the control system.

The engine operating condition may be one or more of an engine torque condition, a net engine torque condition, an engine 'load', a speed, an acceleration, a fuel-air operating ratio and an emissions target, be that for carbon dioxide, particulates, NOx or other emissions targets that may be desirable, exhaust conditions which may comprise temperature and composition of the gas in order to bring about catalytic converter "light-off" (the point at which a catalytic converter reaches an operating temperature such that it becomes effective at converting noxious emissions to less harmful compounds), or exhaust gas conditions that assist with exhaust after-treatments such as Selective Catalytic Reduction (SCR), these being especially prevalent in commercial vehicle diesel engines. In this context, the term "engine torque" denotes torque at the crank before the load applied by the supercharger arrangement is taken into account whilst "net engine torque" denotes torque at the crank after the load applied by the supercharger arrangement is taken into account. The term "engine 'load" is refers to a proportion of full net engine torque available at a given engine operating speed.

The input or inputs to the control system may be directly determined by a person (such as an accelerator pedal of a vehicle), an automated control such as a cruise control or autopilot, other vehicle control systems (such as stability control systems), an engine speed governor (which itself may be mechanical or an integral part of an engine control system) or the vehicle powertrain system which may comprise one or more of an automatic or automated gearbox, infinitely variable transmissions and CVTs (of which examples include mechanical, electric or hydraulic variants), energy storage systems (for example mechanical types (for example a flywheel), electric types (for example a battery) or hydraulic types (for example an accumulator), or other driven devices such as air compressors, air conditioning systems, alternators, oil pumps and any power take-off driven implements. From this, and knowledge of the engine, powertrain and vehicle instantaneous operating conditions, the control system may calculate a target value for a control variable representative of the state of operation of an internal combustion engine associated with the supercharging arrangement.

In the following description the term 'function' is used to describe the variables and algorithms that are used to generate control effort for the adjustment of the control variable, variator ratio and rate of change of variator ratio. The term error will be used to denote the difference between the target of a variable, and the actual value of that variable. In this context, the function will typically comprise a proportional (direct or indirect) or a slew rate element and generates controller effort that typically increases with increasing error value, and decreases with decreasing error value. It may be a fixed function or a function that varies with error and optionally another system variable or other system variables. Optionally, the function may comprise one or both of the integral and the differential (that is to say, the derivative) of the error.

The control variable may be one or more of a supercharger speed, compressor speed, variator output speed, supercharger boost pressure, manifold air pressure, mass air flow, engine output speed, engine torque, engine load and exhaust oxygen content. A control variable error that is the difference between the target and actual (or estimated) value is generated. The control system determines a rate of change of approach to the control variable as a function of the control variable error, and is operative to determine one or both of a corresponding rate of change of variator ratio and variator ratio in order that the target control variable is suitably approached.

Optionally, the required rate of change of variator ratio and variator ratio may be realised using closed loop control (that is to say, feedback control). Open loop ratio control may alternatively be used because it advantageously minimises the use of sensors (for example variator input and output speed sensors) which reduces cost and complexity. An example of open-loop variator control is a stepper motor without position feedback, whilst an example of open-loop rate of change of variator control is a DC motor with leadscrew and nut arrangement which, when fed with a current, sweeps the nut through a distance at a rate that relates to the motor current. An example of closed-loop variator control is a stepper motor with feedback or DC motor with leadscrew and nut arrangement with position feedback using an encoder. One or both of open-loop rate of variator ratio and variator ratio control are preferable because it offers a simpler, lower cost solution.

The control variable or variables may be regulated using either open loop or closed loop (i.e. feedback) control. Open loop control may be achieved when the control variable may be estimated. For instance, consider the case where supercharger boost pressure is the control variable and where engine speed and variator ratio are known (recognising that variator ratio may itself be known from an open loop estimate or by direct measurement) such that compressor speed is known. Knowledge of the compressor speed and engine speed together with knowledge of the compressor map enables the control system to estimate the boost pressure without the need for a specific pressure sensor. Alternatively, a pressure sensor may be used to measure boost pressure directly, and feed this signal back such that the control system may perform closed loop control on this variable.

Inappropriate regulation of the control variable can give rise to undesirable characteristics that compromise driveability, for example rapid rates of change in net engine torque (this is termed 'jerk') which can give rise to undesirable vehicle driving characteristics. It is preferable that the rate of change of approach to the target to be a function of the error, and preferably some proportional function of the error, although it is understood that the function may contain many of the aforementioned options. It is preferable that the target control variable or variables are approached substantially asymptotically. For example, approaching a target manifold pressure substantially asymptotically results in a similar rate of approach to the final net engine torque condition, this being desirable as it is both smooth and continuous.

It is also recognised that the inertial torque of the supercharger arrangement as referred to the crank may exceed a threshold such that net engine torque delivery to the driven roadwheels of a vehicle is momentarily increased or reduced or in any case disturbed, again giving rise to undesirable torque characteristics that would be felt by the driver. Engine acceleration has a smaller impact upon torque experienced by the driver as this component of inertial torque may only impact the net engine torque if the engine is accelerating rapidly. However, a rapid rate of change of variator ratio which may be applied in order to achieve a control variable target could cause a large disturbance to net engine torque, even at fixed engine speed. The inertial disturbance torque referred to the crankshaft may be described as follows:

$$T_{inertia_{ref_{crank}}} = J_{sc} R_1^2 R_2^2 R_v (w_e \dot{R}_v + \dot{w}_e R_v)$$

Where $I_{sc} R_1^2 R_2^2 R_v$ is the supercharger inertial torque referred to crankshaft. Note that, for clarity, $J_{sc}$ is assumed to represent the only significant inertia influencing supercharger arrangement inertial torque in this example. In other examples further inertial components within the supercharger arrangement may be included.

By way of example, $\dot{R}_v$, or any variable that relates closely to $\dot{R}_v$ may be limited in order to limit the inertial torque applied to the crank.

It is desirable that the sum of the steady state supercharger torque and the disturbance torque due to inertial loading from the supercharger arrangement is maintained below a threshold. The threshold may be variable according to the state of other system variables and operating conditions. It may be a fixed or variable proportional of current engine torque, or it may be a fixed value. Preferably the total supercharger torque (inertial and steady state torque referred to the crank) is less than the engine torque, which ensures that the net engine torque is not the opposite sign of the engine torque, as this would be highly undesirable. Even more preferably the total supercharger torque is less than 50% of engine torque. Preferably the threshold rate of change of torque, or jerk, is regulated to be below a pre-determined limit.

This problem may be solved by managing or limiting rate of change of variator ratio such that supercharger arrangement torque referred to the crank is below the threshold level. It is the case that many variables for the control variable are related as some proportional function to variator ratio; for example, it may be shown that variator ratio relates closely to boost pressure and, when the throttle is open, to manifold pressure. It follows from this that the rate of change of variator ratio also relates to the rate of change of most types of control variable. Therefore by targeting a rate of approach to a target control variable (for example, manifold pressure) that is smooth and continuous, provided that the control gains are suitably selected, it is likely that the rate of change of ratio and hence inertial torque applied to the crank will likewise exhibit these desirable characteristics. Hence approaching a target control variable condition suitably also generally ensures that the supercharger arrangement torque (factoring in inertial loading) referred to the crank is below the required threshold, Preferably, this method should also include regulating rate of change of inertial torque, thus ensuring that jerk is maintained below a pre-determined level.

However, it is possible that the rate of approach to the control variable gives rise to a target rate of change of variator ratio and variator ratio signals such that the inertial component of torque does not cause the supercharger arrangement torque referred to the crank to exceed the threshold level. For instance, this may occur if a large non-linearity function exists between the control variable and variator ratio, or if the gains governing the approach to the target control variable give rise to high rates of variator ratio under specific circumstances. To this end, it is advantageous that the controller estimates the inertial torque arising from the target variator rate of change of ratio and variator ratio signals using an expression such as the following:

$$T_{inertia_{ref_{crank}}} = J_{sc} R_1^2 R_2^2 R_v (w_e \dot{R}_v + \dot{w}_e R_v)$$

This inertial torque referred to the crank may be summed with the steady state loading torque from the supercharger arrangement referred to the crank to give a total crank loading torque due to the supercharging arrangement. The steady state supercharger loading torque may be inferred or calculated from estimated or measured values of the control variable and from the estimated or actual engine operating point together with other available data such as the supercharger characteristic map.

If necessary, the control system may then modify, regulate or limit one or both of said target rate of change of variator ratio and variator ratio signals in the event that the supercharger load (including disturbance torque) exceeds said threshold, or would give rise to undesirable jerk.

It may also be necessary for the controller to modify one or both of the rate of change of variator ratio, or the variator ratio signals according to the operating limits of the supercharger and/or variator. As previously described, load borne by the variator is a function of one or more of the variator ratio, adjacent drive ratios, engine acceleration, rate of variator ratio change, engine speed, mass air flow (which itself may be governed by a throttle opening), compressor pressure ratio, boost pressure and supercharger inertia. The firing pulses imparted to the supercharger also cause instantaneous high engine accelerations, and these must all be managed so that viable operational limits for the variator and supercharger are not violated. One example of a potentially challenging event is an engine torque request which leads to a sudden increase in target variator ratio, this giving rise to high variator loads due to high supercharger acceleration. If not monitored, such loads could lead to variator damage or reduced durability. A second example of a severe event is high engine acceleration, for example due to application of full engine torque whilst in a neutral transmission gear. This may lead to high variator loads, and introduces the additional risk that the supercharger may exceed its viable speed limit, this being termed a supercharger 'overspeed condition'. Such a limit typically arises due to centripetal load limits on the compressor or bearing speed limits, violation of which could lead to mechanical damage and unsafe vehicle operation. Furthermore, certain compressors exhibit undesirable characteristics when subjected to certain operating conditions, and it is preferable that these also be avoided. For example, dynamic compressors experience the phenomenon known as surge at low mass flow rate and high pressure ratios, which can result in inefficient operation and supercharger damage. Furthermore, there may be other areas of inefficient compressor operation which are best avoided. One proposed solution is to manage the one or both of the target variator ratio, and rate of change of variator ratio signals such that respective pre-determined thresholds of one or both of the variator and supercharger are not violated. Such supercharger thresholds may comprise one or more of a speed limit, a surge limit, a pressure ratio limit, a boost pressure limit and a drive torque limit. Variator thresholds may comprise one or more limits with respect to its clamp load, input torque, output torque, reaction torque, input power, output power, input speed, output speed, variator ratio and contact traction limits. Accordingly, the controller may advantageously further modify the target rate of change of variator ratio and variator ratio signals to ensure resilient operation of the variable supercharger system.

As previously described, the control system may utilise an engine speed signal, and preferably a rate of change of engine speed signal, in order to modify the target rate of change of variator ratio signal and variator ratio signal. Where the rate of engine speed change is measured, numerical differentiation of the engine speed signal is typically required. Such a technique is well known to create challenges of its own because measured control signals include irrelevant superimposed signals arising from Electro-Magnetic Compatibility (EMC) interference (frequently termed 'noise') and also from mechanical effects such as backlash or stiffness (termed wind-up) and firing pulse disturbances all of which, when differentiated, result in an amplified signal noise which causes unnecessarily aggressive and sporadic control effort to be applied. A common solution to this challenge is the filtering of the engine speed signal, but this introduces delays into the control system that can compromise stability margins or response. A proposed solution is to predict the engine mean acceleration from the percentage of full load, or the net engine torque delivered in combination with any known parasitic, auxiliary drive, powertrain or inertial loads together with knowledge of the operating regime of the transmission and vehicle such as the transmission ratio. This provides the controller with an accurate estimate of engine instantaneous acceleration which it may optionally combine with the filtered engine acceleration signal in order to assist in modifying the target variator ratio and rate of change of variator ratio as required.

Thus the combined effect of the aforementioned solutions is that the one or more input signals to the supercharger control system is ultimately converted to a target variator ratio and rate of change of variator ratio signal which in turn is converted to an input to the variator via the control means this causing a control variable or variables to approach a target value which in turn causes the engine to adopt a required operating condition, as quickly and accurately as possible, and using a variator system that is sufficiently responsive but low cost and lightweight.

In order to achieve optimum control of the supercharger system, it is necessary to be able to sweep variator ratio quickly. A typical requirement for sweeping variator ratio, say from −0.4 to −2.5, is less than 200 ms, this enabling torque response at the crank to be achieved in under 400 ms. Such response will appear to be in keeping with a larger non-downsized naturally aspirated engine. However, it is also necessary to minimise the variator actuator power requirement in order to minimise size, cost and weight. This is especially important for automotive FEADs, including superchargers. Although the ratio-control option may offer the possibility of low power actuation combined with high response, it is important that an appropriate variator technology be used such that it is able to deliver this in practice.

The variator may be of the hydrostatic type (incorporating a pump and a motor), an electric motor-generator CVT, a variable belt drive CVT, a variable chain drive CVT, a ball bearing traction drive (examples include that variator known as a Kopp variator) and in the case of mechanical drives, may be of the friction-drive or traction-drive type. In typical embodiments, the variator is a toroidal variator. Most typically, the variator may be a full toroidal variator in which drive between elements of the variator occurs through a traction fluid. Specifically, the variator may typically comprise: an input surface and an output surface, the input and output surfaces being coaxially mounted for rotation about a variator axis, and a toroidal cavity being defined between the working surfaces; a plurality of rolling elements disposed between and being in driving engagement with the input and the output surfaces at respective contact regions, each rolling element being mounted on a carriage assembly for rotation about a rolling axis, each rolling element being free to pivot about a tilt axis, the tilt axis passing through the rolling element perpendicular to the rolling axis, and intersecting the rolling axis at a roller centre, whereby a change in the tilt angle causes a change in the variator ratio being the ratio of rotational speeds of the races.

Cost and weight can be further optimised by choice of variator configuration. In particular, variators that require very low power for actuation during ratio change are advantageous. This allows the variator to be actuated with a low-cost actuator, for example an electrically-powered actuator. Variators that accomplish ratio change by causing the rollers to rotate about a pitch axis, a mechanism that the applicants refer to as "tilt steer" are particularly suited to this application. Therefore, in preferred embodiments of the invention, in the variator, each carriage assembly can cause pivotal movement, which pivotal movement about a pitch axis that results in a change of a pitch angle of the rolling element, the pitch axis passing through the roller centre and through the contact regions; and the variator further comprising a control member operative to cause a respective carriage assembly to undertake the said pivotal movement thereby changing the pitch angle, so urging the plurality of rolling elements to pivot about their tilt axes and thereby provide a change in variator ratio.

The or each toroidal cavity of the variator advantageously contains no more than two rolling drive elements. The variator may further comprise a reaction member operatively coupled to the plurality of rolling elements such that it bears the reaction torque from the rolling elements within the toroidal cavity.

In embodiments of the invention, the variator may include two similar cavities, whereby it comprises a second input surface and a second, facing output surface defining a second toroidal cavity; a second plurality of rolling elements disposed between the second input and second output surfaces and being in driving engagement with the surfaces, each rolling element being rotatably mounted on its respective carriage assembly and able to tilt about an axis passing through the centre of the rolling element in order to change the variator ratio and being mounted for pivotal movement resulting in the rolling element pitching about an axis passing through the centre of the rolling element and perpendicular to the rotational axis of the rolling element and also perpendicular to the ratio change axis; a control member for actuation of each carriage assembly to pitch the respective rolling element resulting in a change of tilt angle and a change in variator ratio; a first reaction member operatively coupled to the plurality of rolling elements in the first cavity and a second reaction member operatively coupled to the second plurality of rolling elements in the second cavity such that the first and second reaction members bear reaction loads arising from the respective rolling elements.

The variator may further comprise a load-sharing assembly operatively linked to the reaction members of the first and second cavities such that reaction torque from the reaction members is balanced.

Typical embodiments of the invention further comprise a step-up gearset coupled in series with the variator. The step-up gearset is typically connected between the variator and the supercharger. The step-up gearset may include a traction drive epicyclic gearset, and in those embodiments, it may share traction fluid with the variator.

The variator may include a torque sensing arrangement that is operative to reduce the ratio of the variator when the torque applied by the variator to the supercharger exceeds a threshold. This arrangement can serve to protect the variator against damage from excessive torque.

The variator may have a "twin roller" configuration, that comprises:
an input race and an output race each having a working surface, the races being coaxially mounted for rotation about a variator axis, and a toroidal cavity being defined between the working surfaces;
a plurality of rolling elements disposed in pairs and between the races, each pair of rolling elements being mounted on a respective carriage assembly for rotation about respective, mutually inclined rolling axes, the pair of rolling elements being in driving engagement with one another, and each of the pair of rolling elements being in driving engagement with a respective one of the working surfaces, each carriage assembly being free to pivot about a tilt axis, whereby a change in the tilt of the carriage assembly causes a change in the radii of contact between the rolling elements and races, and thereby a change in the variator ratio.

The supercharger may incorporate a dynamic compressor (for example a centrifugal compressor or axial compressor) or a positive-displacement compressor (such as a screw type, scroll type or lobe pump) and may incorporate a plurality of compressors of similar or different types. A typical embodiment would comprise a centrifugal compressor.

From a second aspect, this invention provides a drivetrain for a vehicle comprising an internal-combustion engine and that has an induction system that incorporates a supercharging arrangement with is an embodiment of the invention from its first aspect.

BRIEF DESCRIPTION OF THE SEVERAL VIEWS OF THE DRAWINGS

Embodiments of the invention will now be described in detail, by way of example, and with reference to the accompanying drawings, in which.

DETAILED DESCRIPTION OF THE INVENTION

Figure 1:
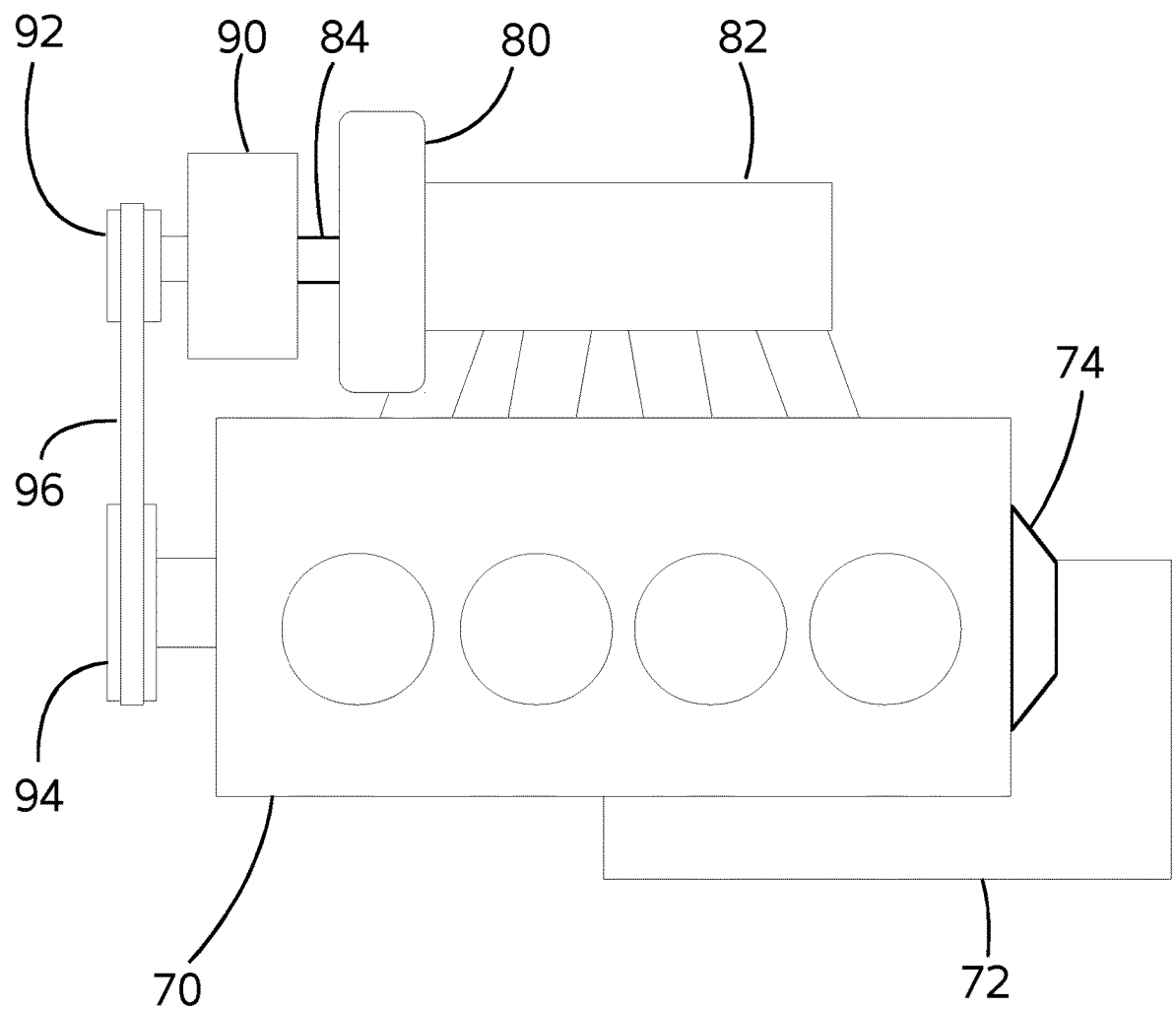
FIG. 1 is a highly diagrammatical representation of a vehicle drive system including a supercharger and a drive arrangement for a supercharger embodying the invention.
Figure 2:
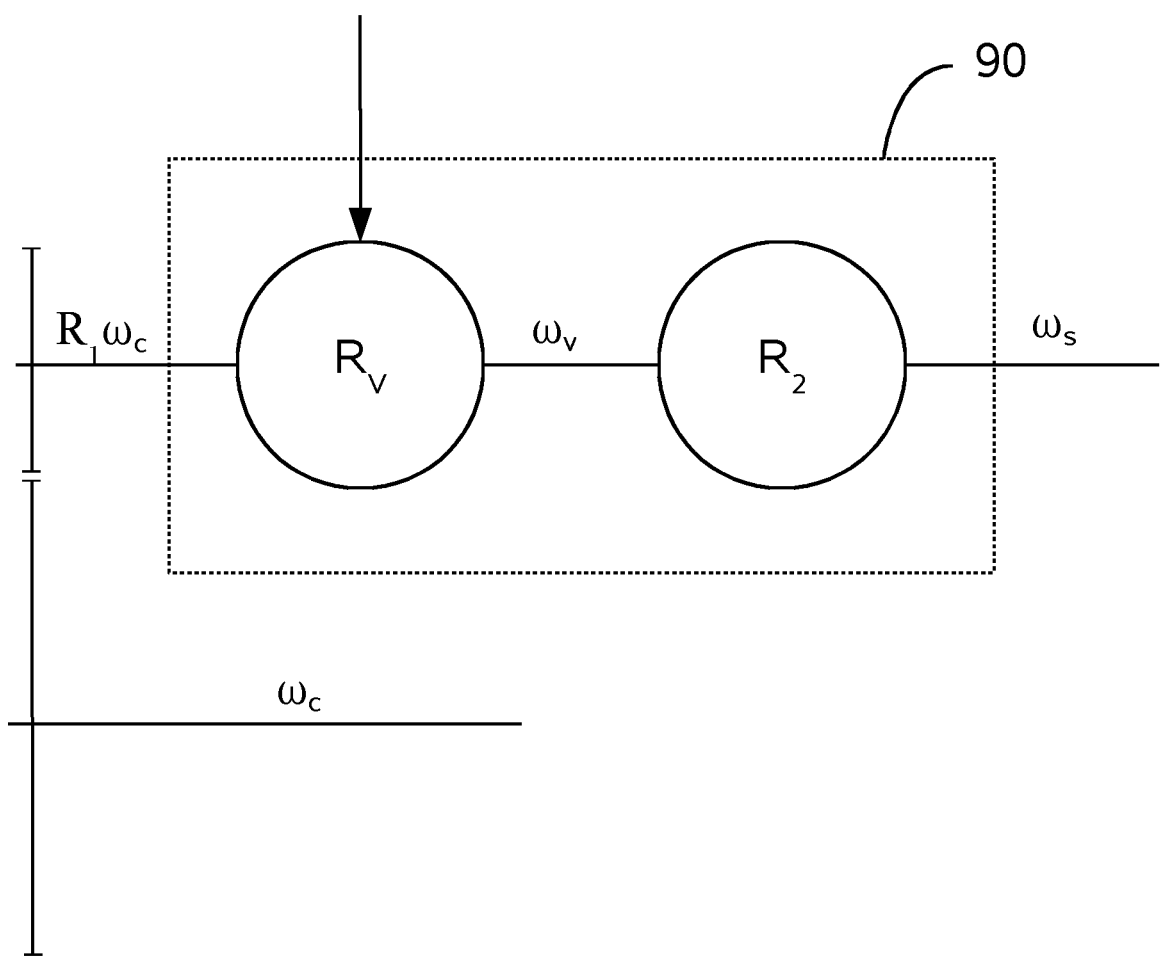
FIG. 2 is a diagram of a drive unit being a component of an the embodiment of FIG. 1.
Figure 3:
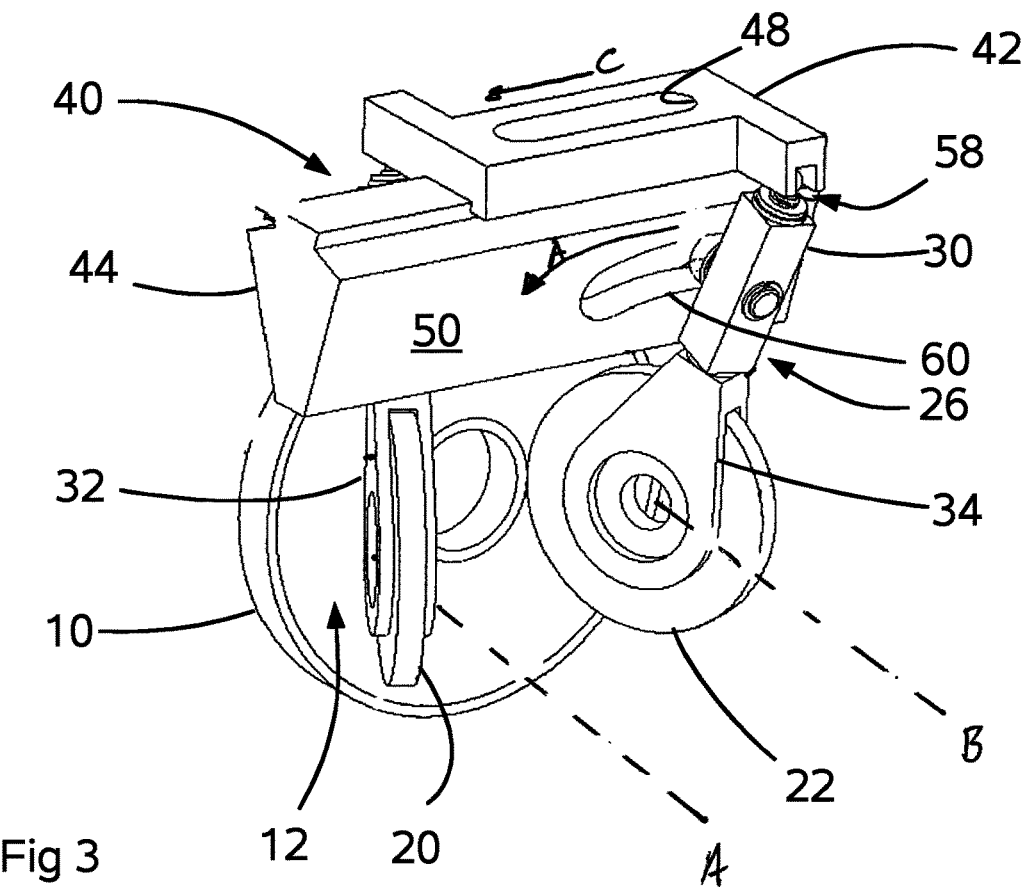
FIG. 3 is a perspective view of part of a first variator that is suitable for use in embodiments of the invention.

With reference to FIG. 1, a drive system for a vehicle, such as a passenger car, comprises an internal combustion engine 70, normally fuelled by petrol or diesel fuel, but alternatively by liquid petroleum gas, ethanol, or a variety of other combustible fuels. A main drive from the engine 70, typically derived from an output at one end of a crankshaft, is connected to an input of a variable-speed transmission 72, typically through a coupling 74 such as a friction clutch or a torque converter. The variable-speed transmission 72 may be continuously-variable between a minimum and a maximum ratio, or may have a plurality of discrete ratios, and may be controlled manually by a driver or automatically. In embodiments where the transmission 72 is continuously-variable, it may have a "geared neutral" ratio, at which its output is stationary irrespective of the speed of its input. In such embodiments, the coupling 74 may be omitted. The output of the transmission 72 is connected to the input of a final drive system that, in turn, transmits drive to road wheels of a vehicle. The final drive system may drive two wheels of a vehicle (two front wheels or two rear wheels) or may drive all wheels of a vehicle, typically splitting drive through a transfer box.

The above describes just a range of typical configurations of a drive system that may embody the invention. Other arrangements are possible, using different arrangements of variable-speed transmission or final drive, and the drive system may be incorporated into a drive in a large range of applications where an internal combustion engine is a prime mover.

The internal combustion engine 70 has an induction system that has a supercharging arrangement. The supercharging arrangement comprises a supercharger 80. The supercharger 80 draws in air through an intake at approximately ambient atmospheric pressure, and delivers air to an inlet manifold 82 of the engine 70 at a pressure that is greater than the pressure at the intake by a pressure difference that depends upon the speed of rotation of a drive shaft 84 of the supercharger 80. Air that passes through the supercharger 80 normally also passes through an air filter and an air-flow meter, and, in the case of a spark-ignition engine, a throttle body. Any or all of these components can be disposed either downstream or upstream of the supercharger 80.

The drive shaft 84 of the supercharger is driven from the crankshaft of the engine 70 from an output shaft of a variable-speed drive unit 90. The drive unit 90 has an input shaft that is driven by the crankshaft of the engine 70. In this embodiment, the input shaft of the drive unit 90 carries a pulley 92 that is connected through a drive belt 96 to a crankshaft pulley 94 that is carried on one end of the crankshaft of the engine 70. The drive belt 96 may also drive other ancillaries, such as an alternator, an air-conditioning pump, a power steering pump, etc.

The purpose of the drive unit 90 is to ensure that the drive shaft 84 of the supercharger 80 is turned at a speed that most nearly approaches an optimum for any given condition of operation of a vehicle drive system. As drive is taken from the crankshaft of the engine to the drive shaft 84 of the supercharger 80, there are three principal stages at which the speed of drive is changed. First, the drive from the crankshaft will drive the input shaft of the drive unit 90 at a speed ratio $R_1$; second, within the drive unit 90, there is a variable ratio stage $R_v$; and third, within the drive unit, there is a fixed ratio stage $R_2$, such that the instantaneous speed $\omega_s$ of the drive shaft 84 of the supercharger 80 is calculated from the speed of the crankshaft $\omega_c$ by $\omega_s = \omega_c R_1 R_2 R_v$. Since $R_1 R_2$ are constants that are calculated as part of the design of the drive system, control of the drive system involves calculating instantaneous optimal value of $R_v$, and causing the variable-ratio stage to operate with a ratio of value $R_v$.

In preferred embodiments that are particularly, but not exclusively, for use with centrifugal superchargers, the variable ratio stage $R_v$ of the drive unit comprises a ratio-controlled full-toroidal variator, and the fixed ratio stage $R_2$ comprises a traction epicyclic drive. Thus, the shaft of the drive unit 90 drives the input to a variator, the variator has an output that drives the input to an epicyclic gearset, and the epicyclic gearset has an output that is connected to the drive shaft 84 of the supercharger 80.

While a wide variety of ratio-controlled variators that are capable of operating in the required speed range and handling the required power can be used in embodiments of the invention, there is a strong incentive to minimise its manufacturing cost and power required for actuation, particularly when used in an automotive application. A range of variators in which ratio is controlled by changing the pitch of rollers in the variator has been found to be particularly advantageous. Several such variators will now be described.

FIGS. 3 to 6 show different views of a part of a variator embodying the invention. The variator comprises an input race 10, shaped generally as an annulus. The input race 10 has an inner surface within which annular recess 12 of arcuate cross-section is formed to provide a working surface of the input race 10. The variator further comprises an output race 14, shown in dotted lines only in FIG. 4 that is substantially similar to the input race 10. The input race 10 and the output race 14 are disposed coaxially on a variator axis V, with their working surfaces facing one another, thus forming a toroidal cavity between the races 10, 14 that is bounded by their working surfaces. Each of the races 10, 14 is mounted for rotation about the variator axis V.

Rolling elements, in this case in the form of approximately cylindrical rollers 20, 22 with suitably profiled outer rolling surfaces are disposed for operation within the toroidal cavity. In this embodiment, there are two such rollers, but it will be understood that a greater number could alternatively be provided.

Each roller 20, 22 is mounted on a respective roller carriage assembly 24, 26. Each roller carriage assembly 24, 26 includes a stem 28, 30 and a fork 32, 34. Each fork 32, 34 carries a respective roller 20, 22 such that the roller 20, 22 can rotate on a bearing for rotation about a rolling axis that extends through its centre. Within each roller assembly 24, 26, each fork 32, 34 can rotate on its stem 28, 30 about a respective tilt axis that is normal to its rolling axis.

Figure 4:
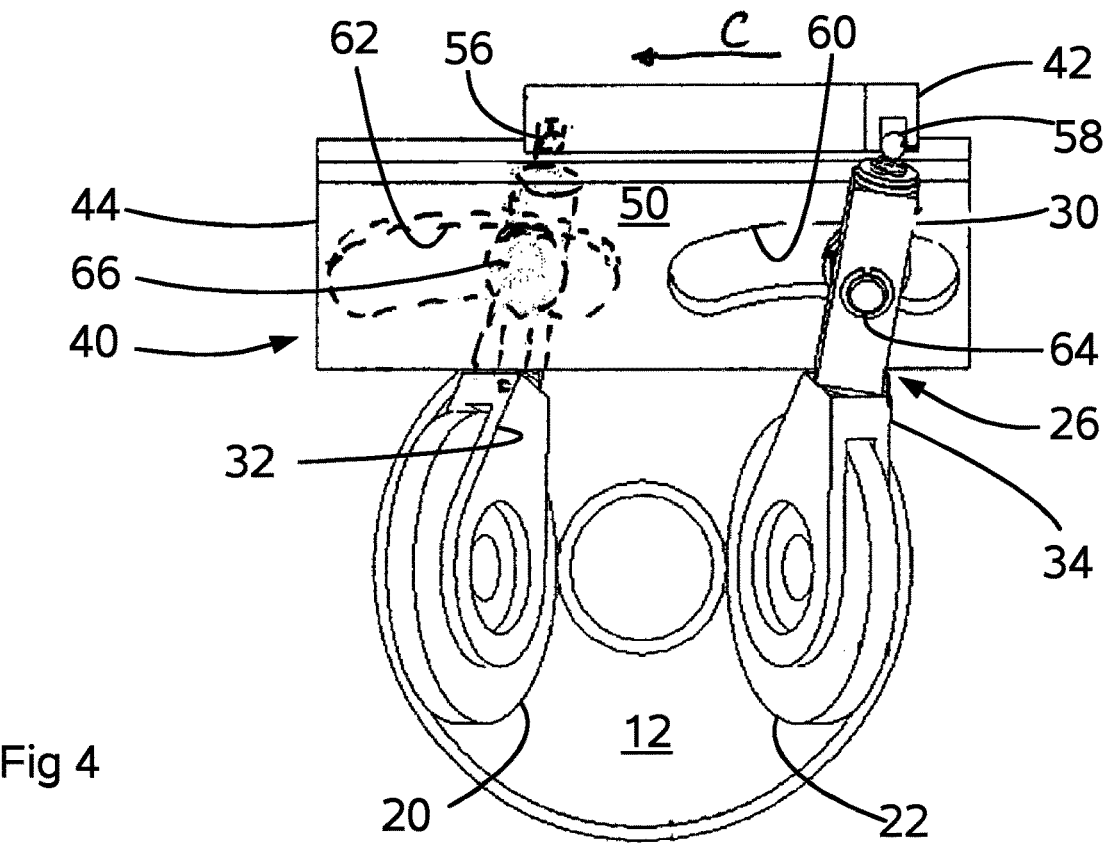
FIG. 4 is a control assembly of the part of the variator shown in FIG. 3.
Figure 5:
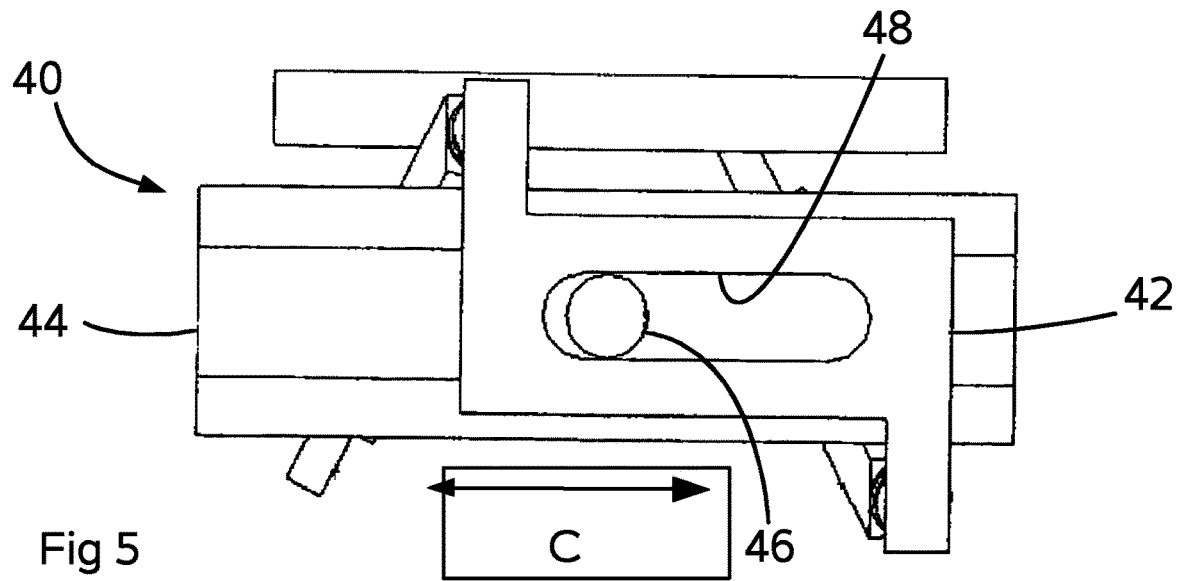
FIG. 5 is a top view of the part of the variator shown in FIG. 3.
Figure 6:
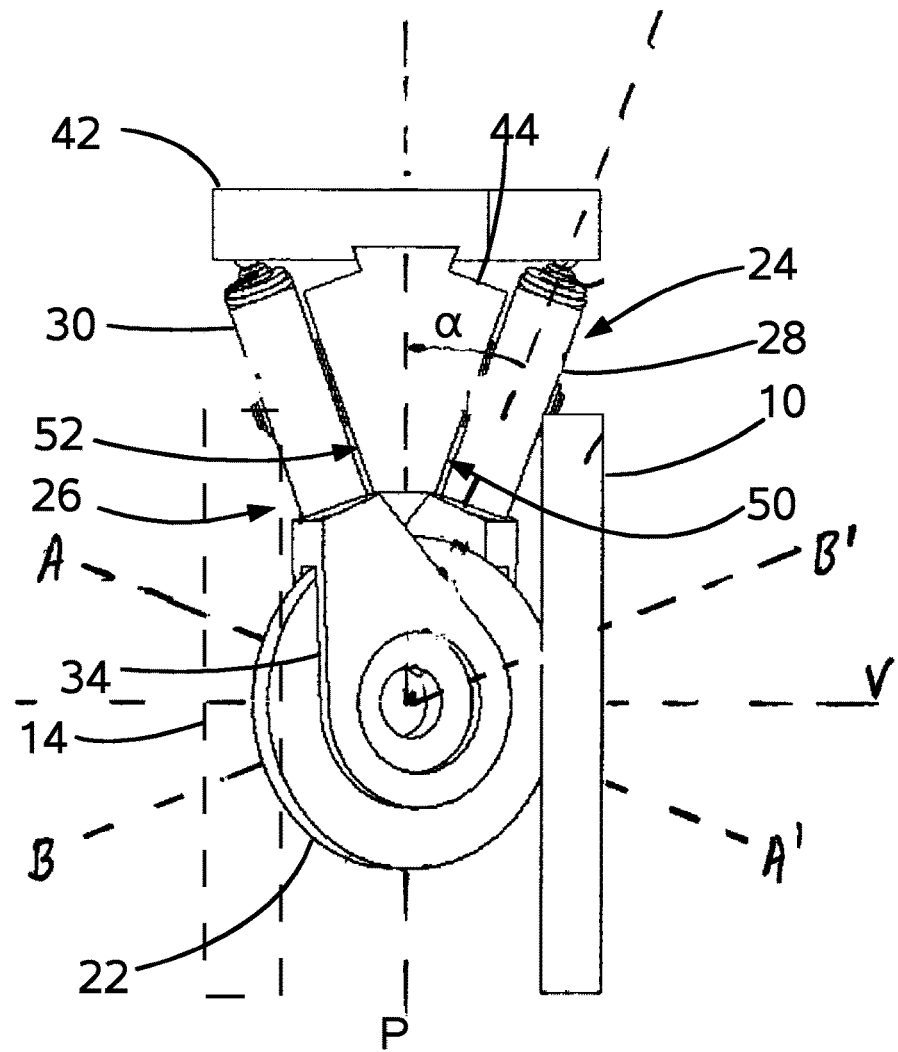
FIG. 6 is a side elevation of the part of the variator shown in FIG. 3.

Each carriage assembly 24, 26 is mounted such that the tilt axis of the stems 28, 30 is inclined to a plane P as shown in FIG. 4. The plane P is perpendicular to the variator axis at an angle "α" known as the castor angle, as shown on FIG. 4. Each roller 20, 22 is free to pivot about the respective tilt axis, being the longitudinal axis of the stem 28, 30, which passes through the centre of the roller 20, 22—that is to say, the castor angle is the angle between the tilt axis and the centre plane of the variator.

The input race 10 is driven by and transmits drive to the output race 14 through the rollers 20, 22 which are in driving engagement between the races.

The variator includes a control assembly 40 which comprises a slider 42 carried on a support 44. The slider 42 is adapted for reciprocal linear movement relative to the fixed part 44. A peg 46 projects from the support 44 through a slot 48 in the slider 42 such that it acts as a stop to limit the range of movement of the slider 42 on the support. The control assembly 40 is adapted to provide control actuation of the variator by translational movement. The slider 42 is able to travel back and forth along the support 44 in a direction indicated by arrow C, in a plane perpendicular to the variator axis. In this embodiment, the slider 42 is connected to each roller carriage assembly 24, 26 at a location radially outward of a cylindrical plane which is parallel to the variator axis V and tangential to the periphery of the larger of the input race 10 and output race 14. In an alternative embodiment, the carriage assemblies 24, 26 may each be actuated by their own actuator. The support 44 has reaction surfaces 50, 52 that are each inclined at the castor angle α to the centre plane of the variator perpendicular to the variator axis V.

The control assembly 40 is operatively coupled to the carriage assemblies 24, 26 by actuation joints 56, 58. The actuation joints 56, 58 constrain upper end parts of each stem 28, 30 to move linearly with the slider 32 while allowing the stems 28, 30 to pivot with respect to the slider 32. The single control assembly 40 controls both carriage assemblies 24, 26 in unison. The carriage assemblies 24, 26 are also coupled to the control assembly 40 at respective reaction points. Each reaction point comprises an arcuate slot 60, 62 that extends into a respective reaction surface 50, 52 of the support 44. The stem 28, 30 of each of the carriage assemblies 24, 26 carries a projecting reaction pin 64, 66 that extends into a respective arcuate slot, in which it is a close sliding fit with sufficient to allow free sliding engagement of each reaction pin 64, 66 in its slot 60, 62. The stem may be equipped with rollers to provide smooth engagement and a rolling engagement with the slot.

(In an alternative arrangement, the arcuate slots may be arranged perpendicular to the stems 28, 30 with the stem passing through the slot and forming the engaging part which cooperates with the slot to locate the roller carriage.)

Each roller 20, 22 and its carriage assembly 24, 26 together have four points of contact with the variator; contact between the roller 20, 22 at the working surface of the input race, the working surface of the output race 14, with the control assembly 40 at the actuation joint 58, 58, and the reaction point through the reaction pin 64, 66 and its respective slot 60, 62. Each carriage assembly 24, 26 is located within the toroidal cavity by the two points of contact with the control assembly 40 and by the contact between the roller and the working surfaces of the input and output races. These points of contact mean that the carriage assemblies 24, 26 are mounted such that they are able to move pivotally to vary a pitch angle about a respective steering axis A-A', B-B' passing through the centre of the rollers 20, 22 and perpendicular to the plane of movement of the slider 44. This steering axis is perpendicular to the tilt axis of the carriage assembly. The carriage assemblies carriage assembly 24, 26 are actuated through the actuation joints 56, 58, situated radially distant from the roller pivot axes, such that the carriage assemblies 24, 26 sweeps through an arc centred on the axis A-A', B-B'. The rollers are guided by the engagement of engagement parts 14, 24 with slots 33, 34. The roller carriages 24, 26 are constrained to the pivotal movement by the coupling of the reaction pins 64, 66 in their slots 60, 62 about the reaction point. The arrangement allows reaction torque from the rollers 20, 22 to be borne.

The pivoting motion of the carriage assemblies that occurs as the slider 44 moves imparts to the rollers 20, 22 a component of rotation about their tilt axis (that is, an axis passing through the centre of the roller and which is parallel to the variator axis V). The pivoting motion also imparts a component of rotation about an axis perpendicular to the tilt axis, referred to as a ratio change axis. This rotation allows each roller 20, 22 to alter its tilt so as to change the speed ratio and may momentarily experience contact forces from the input and output surfaces. The mounting of the roller 20, 22 in a fork 32, 34 such that is may rotate about its precession axis enables the roller 20, 22 to tilt so as to find a path of least resistance to reach equilibrium so as to change the variator ratio. In this way, through the combination of the pivotal movement of the carriage assembly and the freedom of rotation about the tilt axis, the roller is free to undergo a tilting motion to provide a change in variator speed ratio. The rollers 20, 22 are therefore able to steer (that is, to vary their tilt) in response to an actuation force by pitching about an axis parallel to the variator axis and alter their position to change the speed ratio of the variator. To achieve optimal pivoting movement that minimises any component that serves to change the roller tilt and therefore the variator ratio, the slots 60, 62 are formed such that when their shape is projected onto a plane normal to the variator axis is an arc centred on the variator axis.

In another embodiment, each carriage assembly comprises a stem alone with the rollers being mounted on the end of the stem through a gimbal. In this arrangement each roller 20, 22 is mounted on its respective carriage assembly by a pivoting joint passing through the roller centre such that the roller is free to tilt about its tilt axis. The stem suitably lies in the centre plane P of the variator and the gimbal arrangement provides the castor angle and degrees of freedom for the roller 20, 22 to freely tilt.

Figure 7:
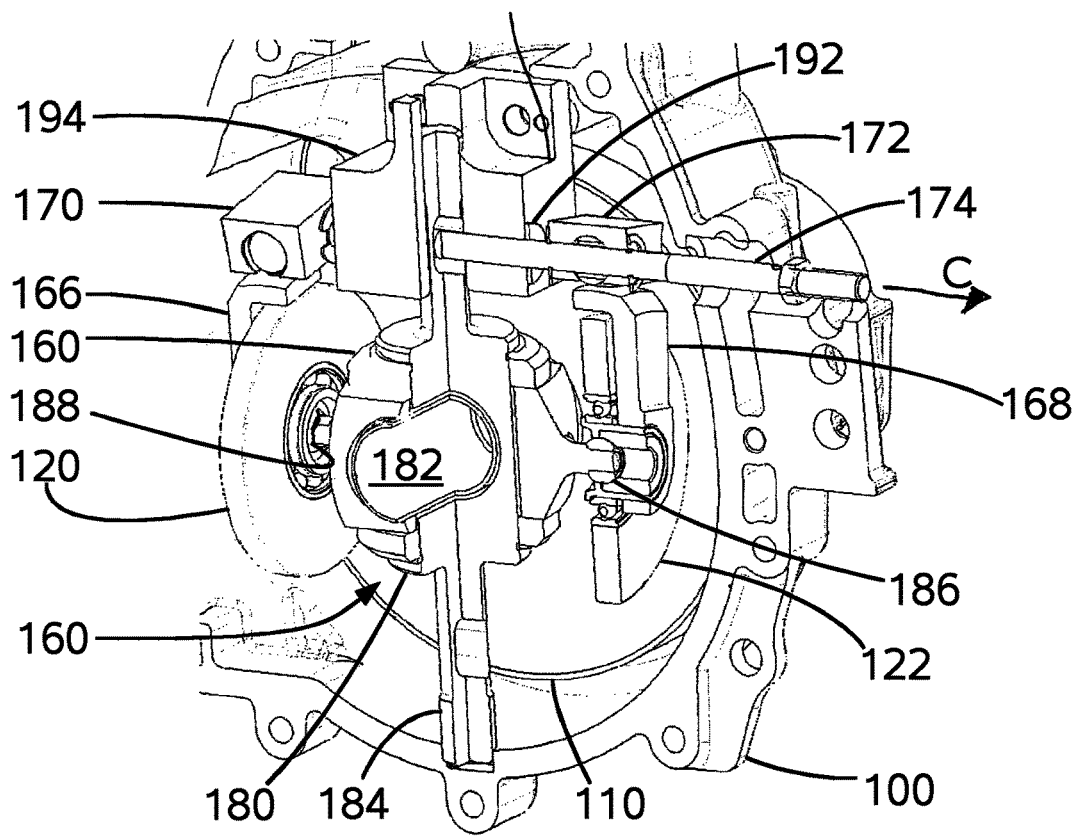
FIGS. 7 and 8 are perspective and part cut-away views of part of a second variator that is suitable for use in embodiments of the invention.
Figure 8:
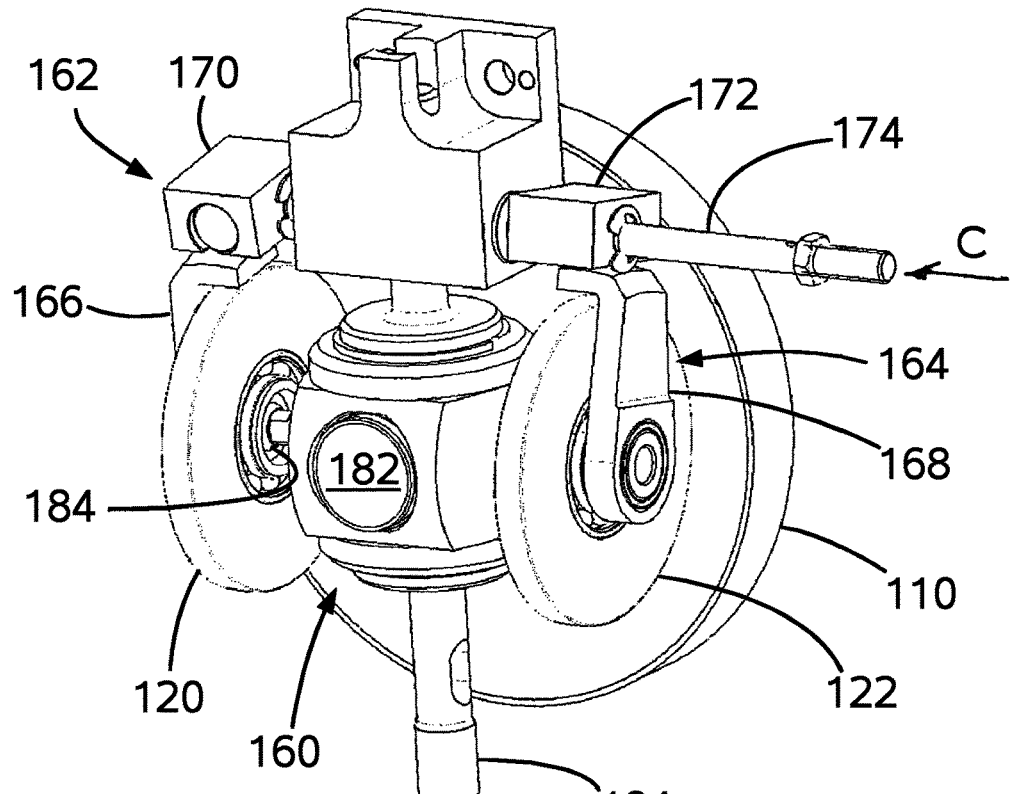

FIGS. 7 and 8 illustrate part of a variator that includes a reaction member 160 operatively coupled to the rollers 120, 122 that transmit drive between the input race 110 and the output race (not shown). The purpose of the reaction member is to bear reaction torque from the rollers 120, 122. The rollers 120, 122 are mounted on carriage assemblies 162, 164. Each carriage assembly comprises a carrier 166, 168 and a mounting part 170, 172. Each roller 120, 122 is carried for rotation about its axis on a respective carrier 166, 168. Each carrier 166, 168 is pivotally connected to the respective mounting part 170, 172.

Each mounting part 170, 172 is carried on an elongate control member 174, such that it is prevented from lineal movement along the control member 174. The control member 174 may move in a linear, reciprocal manner in direction C, causing the mounting parts 170, 172 also to move in direction C. (In this embodiment, the control member does not comprise a movable and a fixed part with the slot arrangement shown in FIGS. 1 to 4.) Each carriage assembly is located within the toroidal cavity by the connection between the mounting parts 170, 172 and the control member 174, and by reaction point at the centre of the roller 120, 122 by its contact with the reaction member 160. In this embodiment reaction torque is borne by the reaction member 160 and not by the control member 174.

The reaction member 160 comprises a body 180 having an aperture 182 through which a variator input shaft and/or output shaft may pass with clearance. Reaction shafts 184, 190 project coaxially and in opposite directions from the body 180 and are aligned normal to the variator axis within the centre plane of the variator. End portions of each reaction shaft 184, 190 are retained in apertures formed, respectively, in a casing 100 of the variator and a mounting block 194 secured to the casing 100 such that shafts 184, 190 can rotate within the apertures. As a couple is applied to the reaction member 160 it is caused to rotate, which would urge the shafts 184, 190 to rotate. However, by restraining the end portion of the shafts 184, 190 within the apertures, the reaction torque is resisted. The reaction member 160 is operatively linked to the centre of each roller 120, 122 by a spherical joint 186, 188 so as to transmit the reaction torque from the rollers 120, 122 to the reaction member 160 and to allow for relative pivotal movement between the rollers 120, 122 and the reaction member 160. The reaction member 160 is mounted for rotation about the variator axis in response to reaction torque arising from the disc/roller contact during rotation of the discs thereby changing the variator ratio.

The control member 174 passes through the reaction member 160 at an aperture 192 but is not linked to it. There is suitably sufficient clearance between the control member 174 and the aperture 192 to avoid fouling as reaction torque is borne and the reaction member rotates about the variator axis.

The reaction member 160 is movable radially of the variator axis and may be moved in a non-radial direction such that that the reaction member 160 balances reaction loads generated by each roller 120, 122 within the toroidal cavity.

The reaction member 160 may include a damper to dampen movement of the body 180 for example in a radial direction relative to the variator axis. A mechanical end stop may be provided to limit movement of the reaction member 160 in a radial direction relative to the variator axis.

Figure 9:
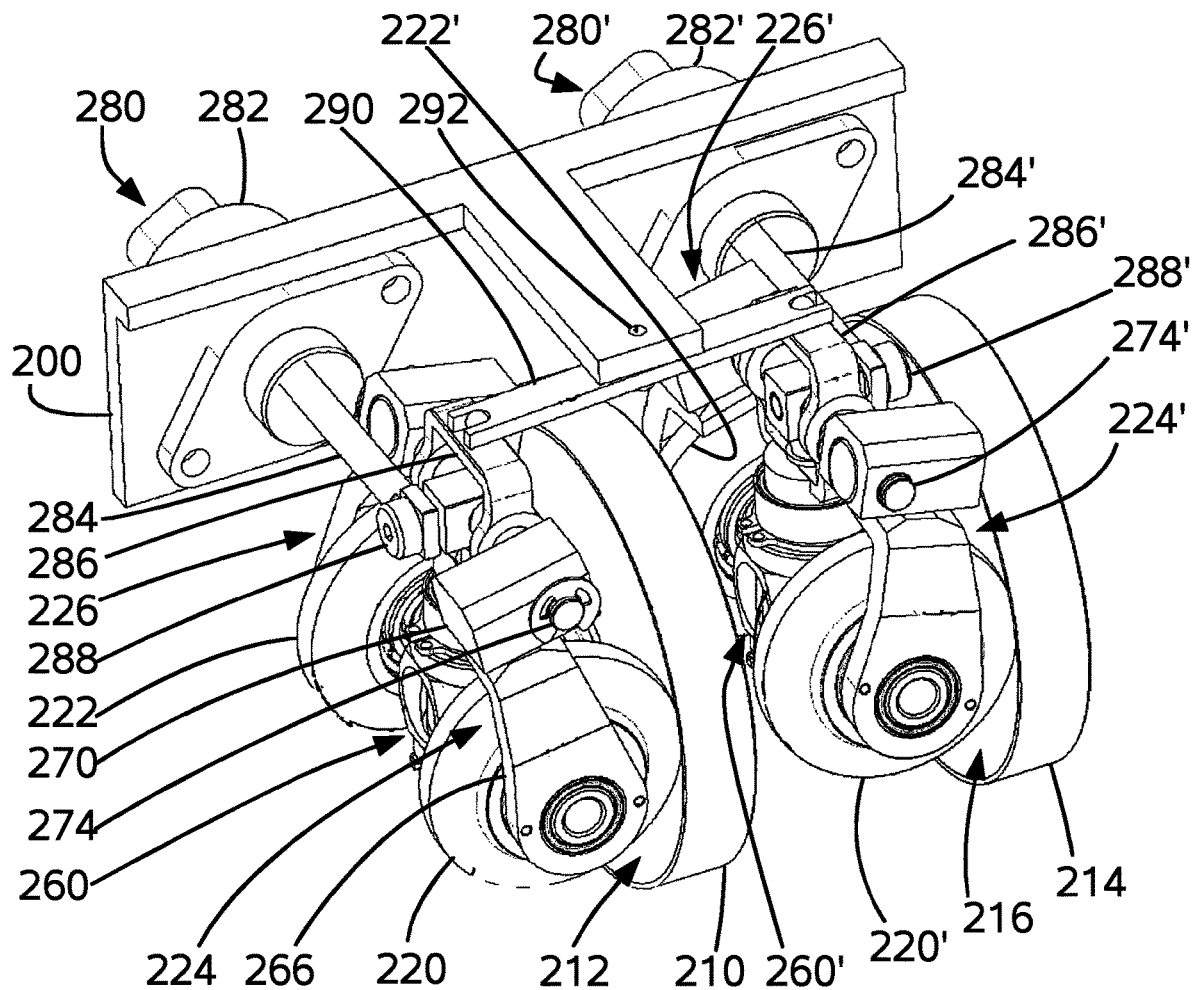
FIG. 9 is a perspective view of part of a third that is suitable for use in embodiments of the invention.

FIG. 9 shows a part of a twin-cavity variator embodying the invention. The variator comprises an input race 210 and similar first and second output races 214 (only one is shown) disposed, in the direction of the variator axis, to opposite sides of the input race 210. Each output race 214 has a working surface 216 that faces the input race 210. The input race 210 has first and second working surfaces 212 that face, respectively, the first and second output races 214. Therefore, two toroidal cavities are defined, a first between the input race 210 and the first output race 214, and a second between the input race 210 and the second output race.

A first set of rollers 220, 222 is provided within the first toroidal cavity to transmit drive between the input race 210 and the first output race, and a second set of rollers 220, 222' is provided within the second toroidal cavity to transmit drive between the input race 210 and the second output race 214. Each roller 220, 222; 220, 222' is mounted on a respective carriage assembly 224, 226; 224' 226'. Each carriage assembly comprises a carrier 266 and a mounting part 270. The roller 220 is mounted for rotation on the carrier 266. The carrier is connected to the mounting part 270 such that it is free to undergo a tilting motion to change the tilt angle of the rollers 220, 222; 220, 222' and thereby change the variator ratio. The respective carriage assemblies 224, 226; 224' 226' are mounted for pivotal movement about an axis that passes through the centre of the respective roller.

A respective actuator 280, 280' is associated with each cavity. Each actuator 280, 280' comprises a body 282, 282' that is fixed to a casing 200 of the variator, and an actuator rod 284, 284' that can be driven linearly into or out of the body by suitable application of an electrical signal or hydraulic fluid, as the case may be, to the actuator 280, 280'.

Within each cavity, the mounting parts 270 of the two carriage assemblies are 224, 226; 224' 226' are connected to a common control rod 274, 274, such that they are fixed to the control rod against linear movement, but can pivot with respect to it. Each control rod 274, 274' is connected to a respective actuator rod 284, 284' through joint 288, 288' that admits pivotal movement between the control rod and the actuator rod. Thus, operation of the actuators 284, 284' causes linear movement of the control rods 274, 274, and therefore linear movement of the carriage assemblies 224, 226; 224' 226.

Each cavity has a reaction member 260, 260' to which the rollers 220, 222; 220, 222' are operatively coupled by spherical joints such that the reaction members bear reaction loads arising from the respective rollers, substantially similar to the arrangement of the preceding embodiment. As in the preceding embodiment, each reaction member 260, 260' has reaction shafts, an end portion of one of which is retained within an aperture of the casing 200 of the variator. The other reaction shaft is secured by a yoke 286, 286' that has apertures through which the control rods 274, 274' pass.

The reaction members 260, 260' are operatively linked by a load-sharing assembly. The load-sharing assembly comprises a bar 290 mounted to the casing 286 by a pivot 292. The bar 290 is pivotally connected to the yokes 286, 286' symmetrically about the pivot 292. Therefore, an equal and opposite force is applied to each reaction member through its yoke, which ensures that an equal reaction torque is applied to the rollers 220, 222; 220, 222' in the two toroidal cavities.

Figure 10:
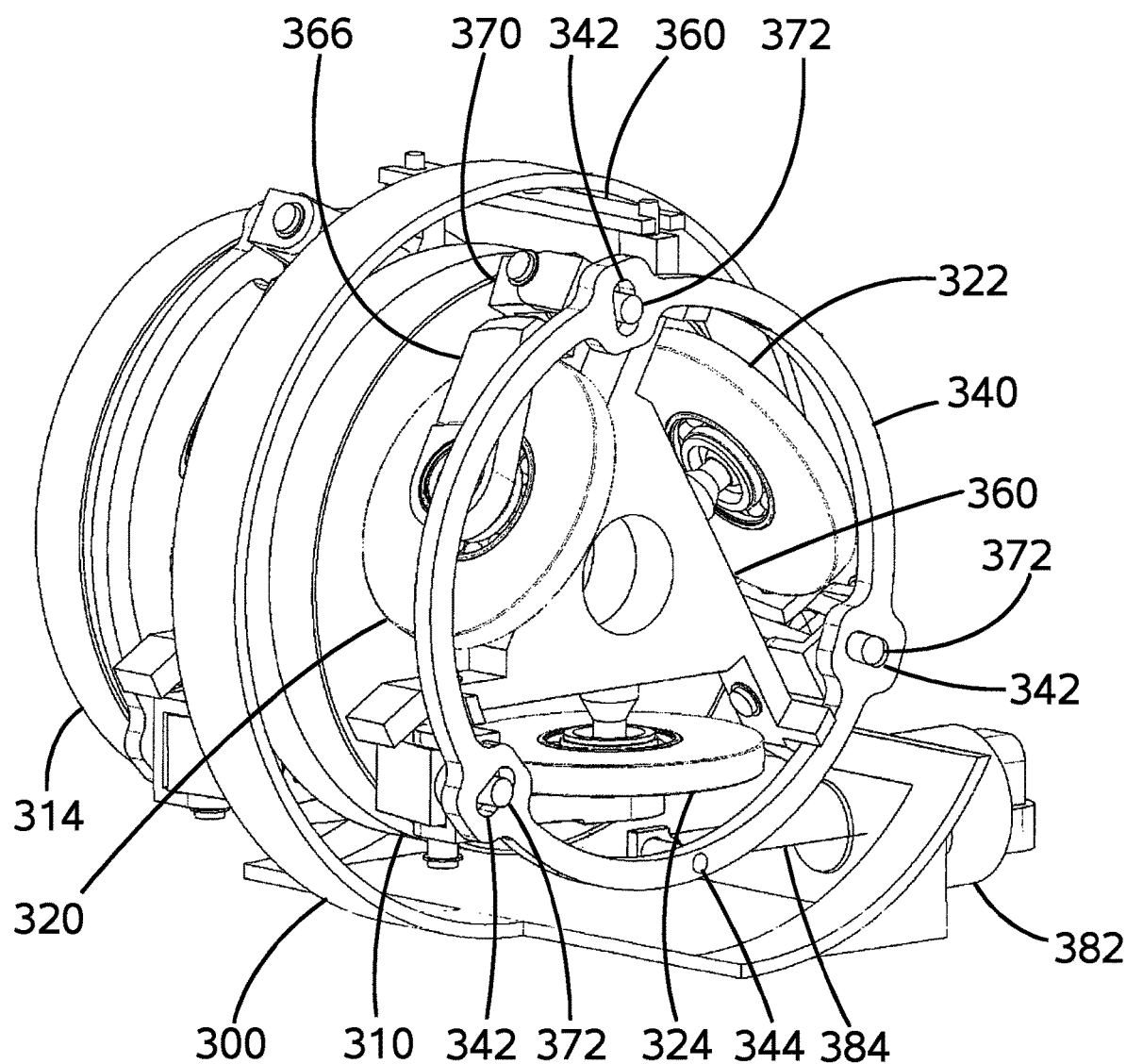
FIG. 10 is a perspective view of a variator being a fourth variator that is suitable for use in embodiments of the invention.
Figure 11:
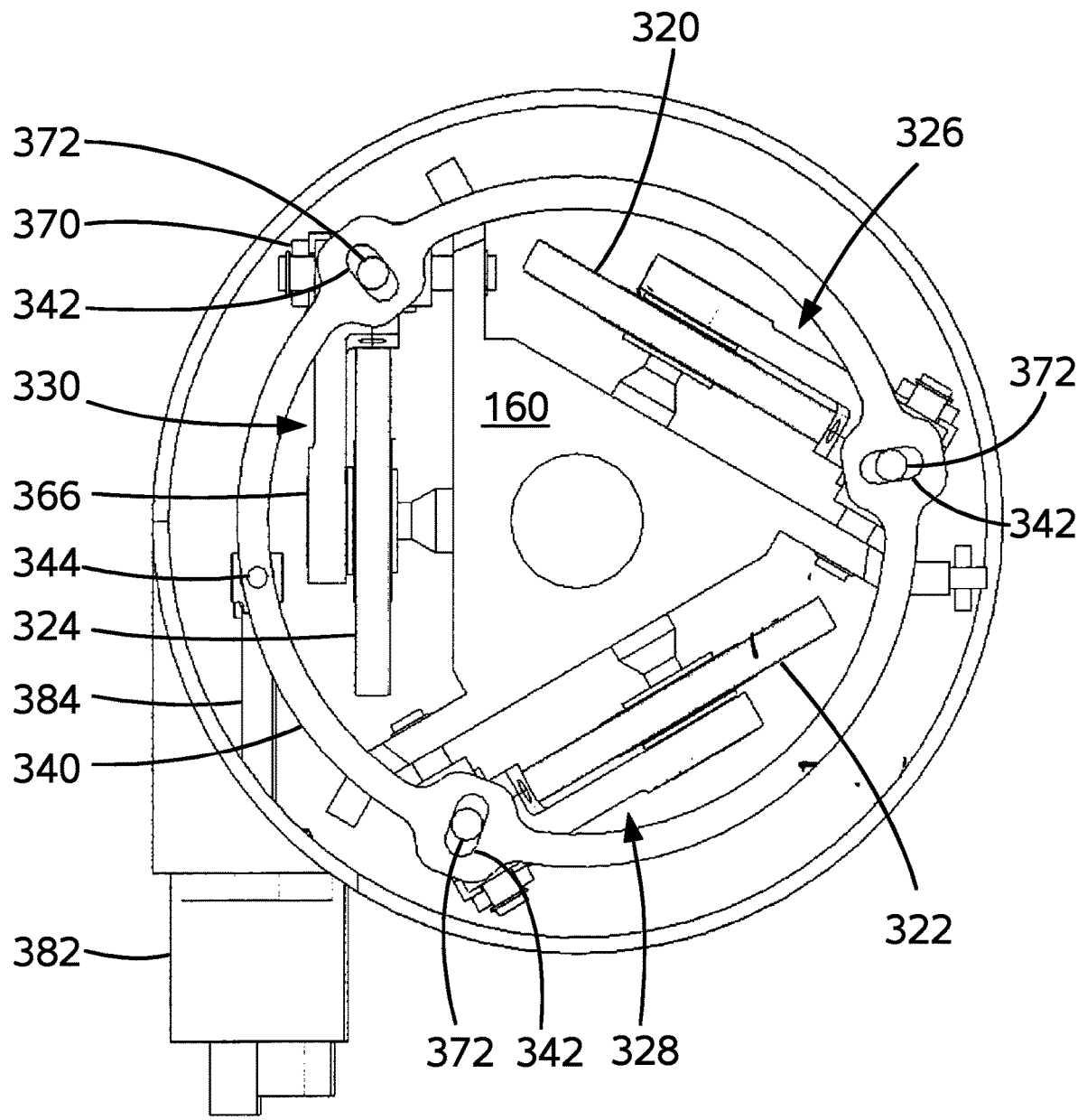
FIGS. 11 and 12 are an axial view and a top elevation of the variator of FIG. 10.
Figure 12:
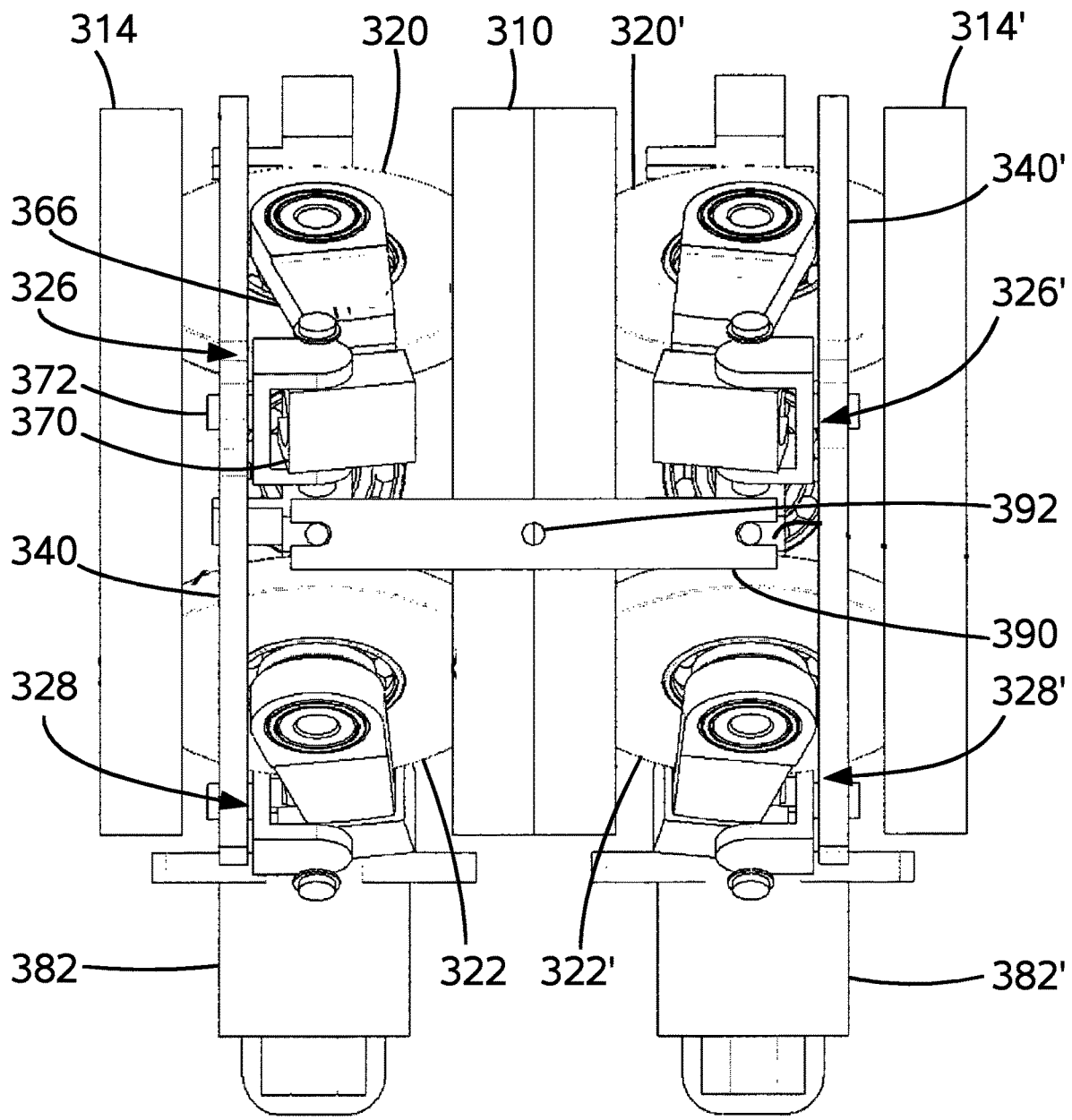

FIGS. 10 to 12 illustrate another embodiment of the invention. The variator comprises an input race 310 and similar first and second output races 314 (only one is shown) disposed, in the direction of the variator axis, to opposite sides of the input race 310. Within each of the two toroidal cavities defined by the races, there are three rollers 320, 322, 324; 320; 322' (one of which is not shown in the drawings).

The variator comprises a reaction member 360, 360' in each cavity. The reaction members 360, 360' are coupled to one another by a load balancing assembly that includes a bar 390 pivotally mounted on a casing 300 of the variator, each reaction member 360 being pivotally connected to the bar 390 symmetrically about its pivot 392.

Each roller 320, 322, 324; 320', 322 is carried for rotation by a respective carriage assembly 326, 328, 330; 326' 328' (one of which is not shown in the drawings). Each roller carriage assembly 320, 322, 324; 320; 322 comprises a carrier 366 and a mounting part 370. The roller 320 is mounted for rotation on the carrier 366. The carrier 366 is connected to the mounting part 370 such that it is free to undergo a tilting motion to change the tilt angle of the rollers 320, 322, 324; 320; 322 and thereby change the variator ratio. A control peg 372 projects from each mounting part.

An annular control member 340, 340' is provided in each cavity. Each control member 340, 340' has three radial slots 342 into each of which, one of the control pegs 372 is received. The variator further includes an actuator associated with each cavity. Each actuator comprises a body 382, 382' that is fixed to a casing 300 of the variator, and an actuator rod 384 (only one of which can be seen in the drawings) that can be driven linearly into or out of the cylinder by suitable application of an electrical signal or hydraulic fluid, as the case may be, to the actuator. Each actuator rod 384 is connected to a respective control member 340, 340' by a pivot 344, 344'. By this arrangement, operation of the actuator causes the control members 340, 340' to rotate, which, in turn, causes movement of the control pegs 370, and thus rotation of the carriers 366 on their respective mounting parts 370.

Figure 13:
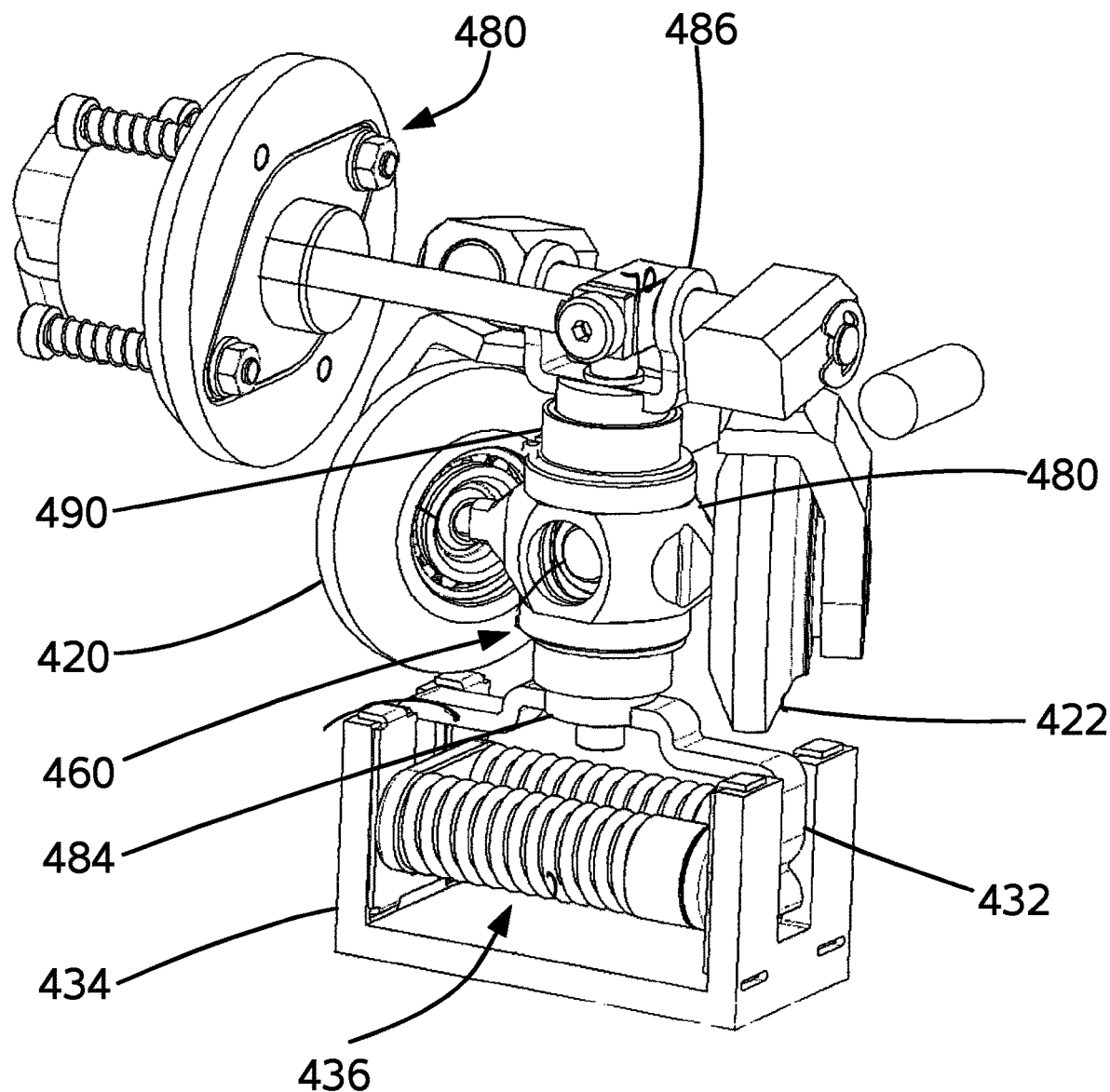
FIGS. 13 and 14 show a variator being a fifth variator that is suitable for use in embodiments of the invention.
Figure 14:
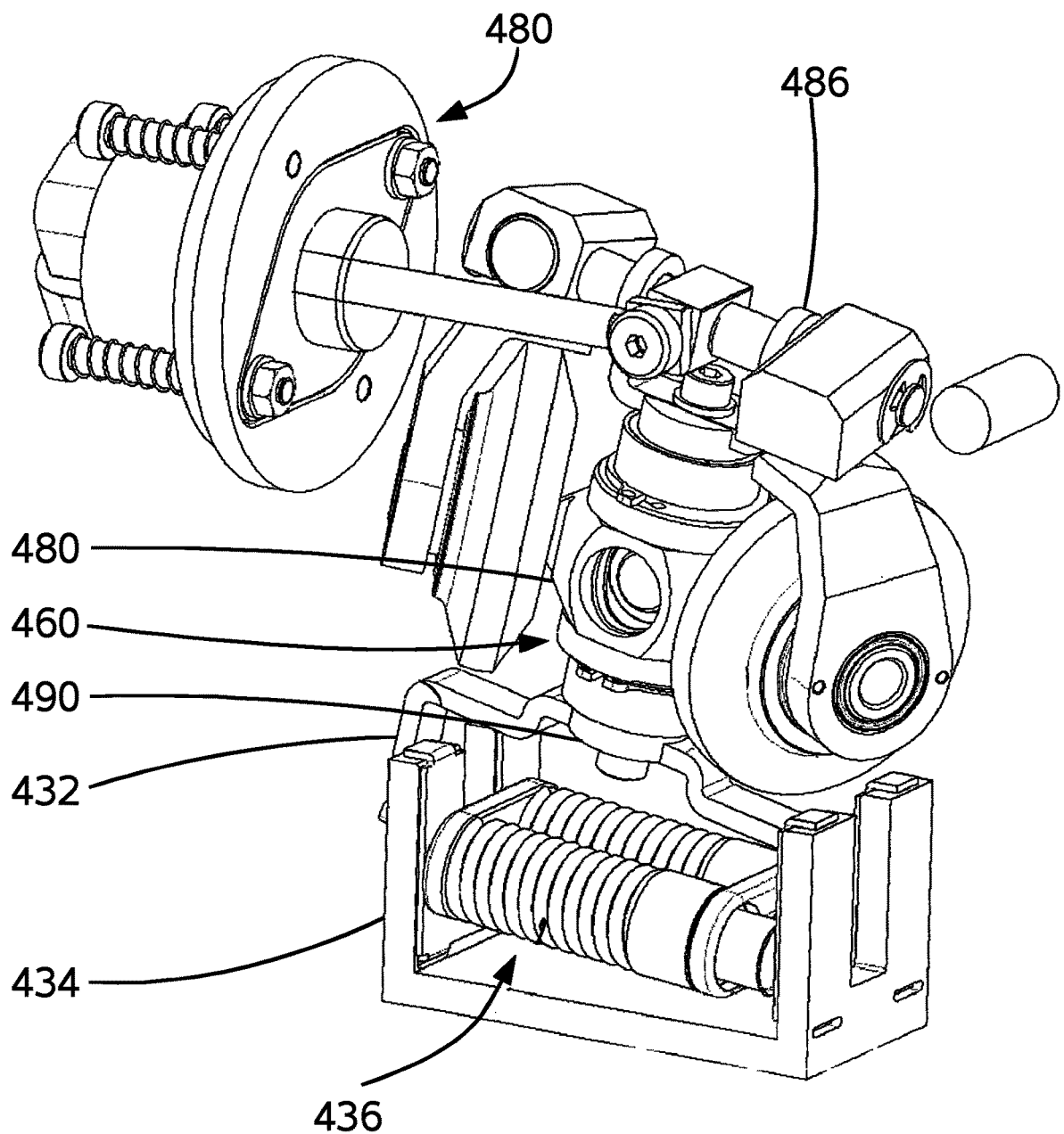

In FIGS. 13 and 14 the reaction member 460 is mounted for rotation about the variator axis in response to a reaction torque above a pre-determined level. The reaction member 460 comprises a body 480 having an aperture 482 through which a variator input shaft and/or output shaft may pass with clearance. Reaction shafts 484, 490 project coaxially and in opposite directions from the body 480 and are aligned normal to the variator axis within the centre plane of the variator. As in the second embodiment, one of the reaction shafts 490 is connected to an actuator 480 through a yoke 486. The other reaction shaft 490 is linked to a resilient mounting assembly 430.

In this embodiment, the resilient mounting assembly 430 includes a support bar 432 to which the reaction shaft 490 is connected and a cradle 434 that is connected to a casing of the variator. The support bar 432 is retained in the cradle by compressed springs 436 against which the reaction shaft 490 applies a torque reaction force. The reaction torque creates a couple on the support bar 432 and its rotation displaces transmission the reaction shaft 490. The springs 436 may be set to deflect when the force applied exceeds a certain threshold. The force imparted may be detected and employed to provide an input signal to the control member 470, for example such that the control member acts to reduce the reaction torque detected, thereby operating to reduce the torque passing through the variator.

In embodiments of the invention that incorporate a variator as described in the last-preceding paragraph, the variator is configured such that the reduction in ratio effected by the reaction member when the torque exceeds a threshold serves to complement the operation of the control system. Thus, if a transient change in operating conditions causes a sudden acceleration or deceleration of the engine, a variator with this configuration can protect components of the supercharging arrangement and associated components against damage from excessive torque.

It will be seen that in each of these embodiments, actuation of the variator to cause the rolling elements to pitch takes place substantially or entirely radially outwardly of the rolling elements. Thus, components that are responsible for performing actuation have minimal or no intrusion into the space between the rolling elements. In each of these embodiments, actuation of the variator to causes the rolling elements to pitch takes place in a space that does not extend beyond the races in a direction parallel to the variator axis. In many cases, when the variator is used as part of a larger transmission system, there is little or no available space beyond the races in the direction of the variator axis within which components can be packaged. In addition, in each embodiment, the axis about which the pitching rotation occurs is not coincident with a physical component such as a shaft and an axis—instead, it is defined by the constraints imposed upon the motion of the carriers by components (such as the actuation point and the reaction point) that are remote from the tilt axis.

The supercharging arrangement further includes a control system that operates to generate a signal to be applied to the actuator of the variator to cause it to operate at a specific ratio $R_V$, the aim being to optimise operation of the internal combustion engine 70.

Figure 15:
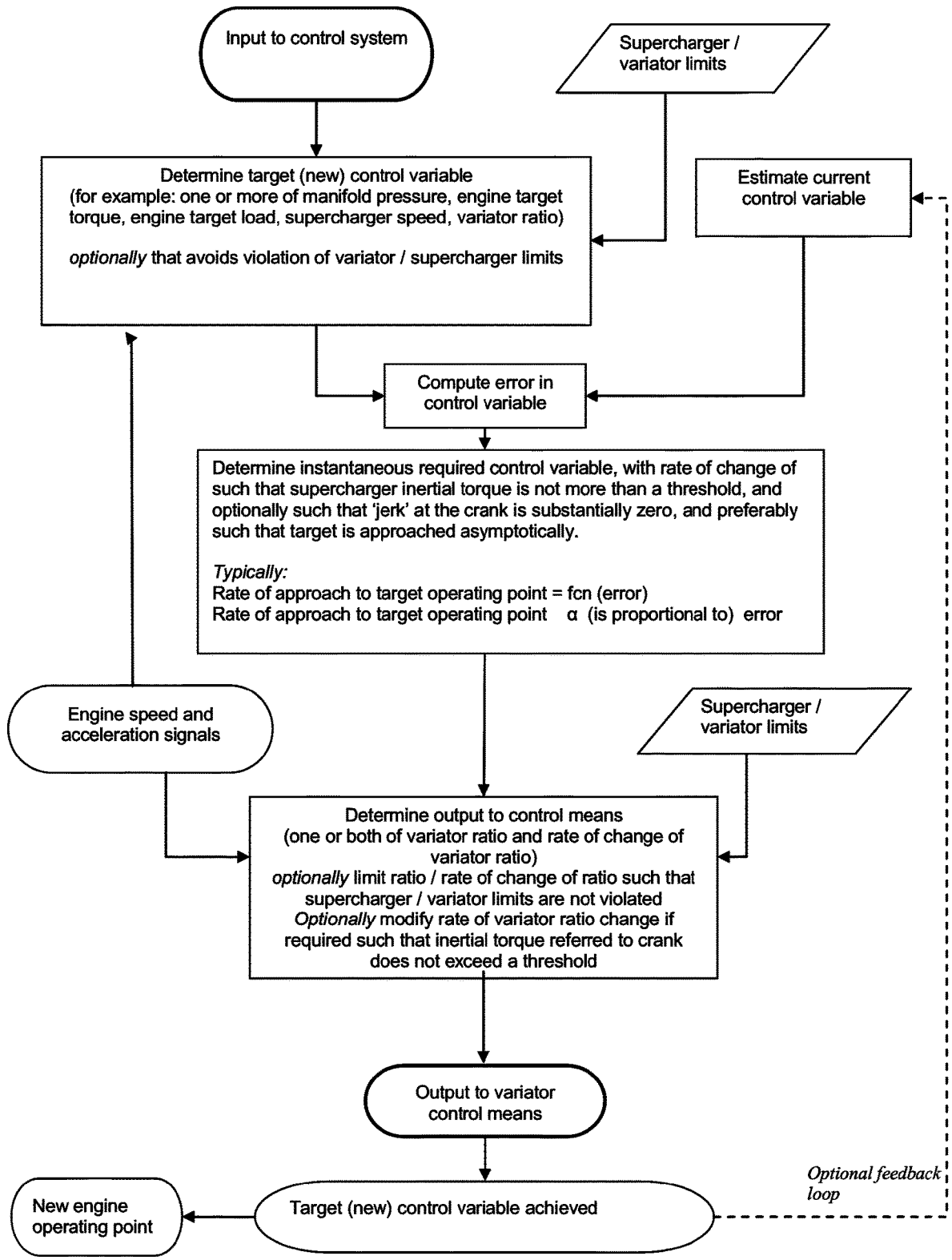
FIG. 15 is a flow diagram that illustrates the general principles of control of a variator in a drive system embodying the invention.
Figure 16:
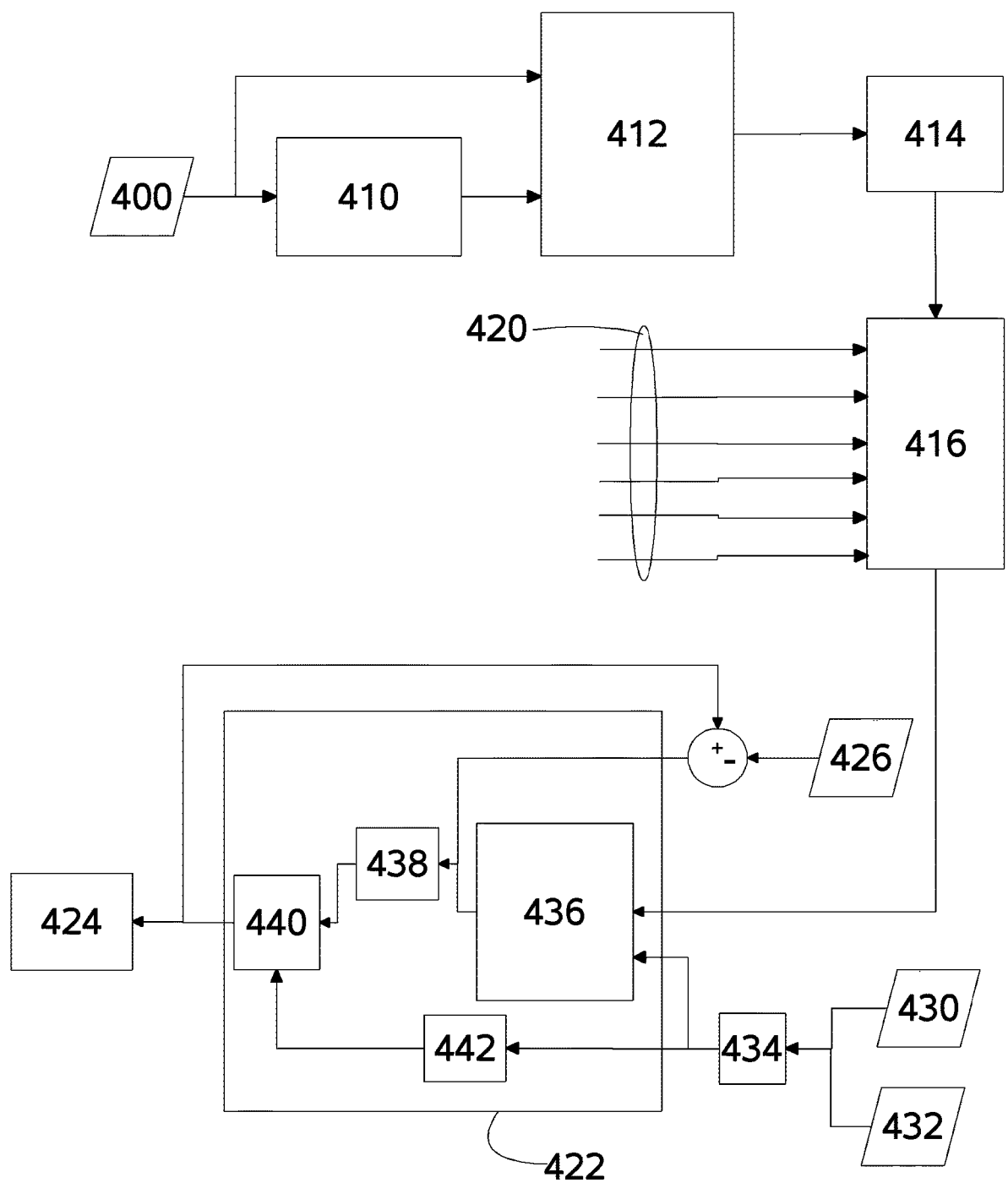
FIG. 16 is a flow diagram that illustrates operation of a specific embodiment of the invention.

A general flowchart that illustrates a suitable control strategy is presented in FIG. 15. A specific example is illustrated in FIG. 16, and its operation will now be described.

The control system responds to the position of an operating control such as an accelerator pedal of a vehicle (or to some other control arrangement such as a cruise control) which gives the required engine operating request to effect the intentions of an operator of the vehicle. This generates a supercharger control variable request which could be a supercharger compressor speed, a supercharger air pressure, a mass air flow or an engine torque output directly. The chosen control variable request will then serve as the main control input in a control strategy which might be closed-loop or open-loop. In this embodiment, this is achieved by calculating the air pressure that should appear at the outlet of the supercharger 80. This generates a supercharger air pressure request 400. The control system then calculates the mass airflow required to achieve the supercharger air pressure request at the current engine speed $\omega_c$. In an open-loop embodiment, a supercharger compressor map 412 is then used to determine the speed of the supercharger that would achieve the mass airflow request, and from that generates an open-loop, steady-state supercharger speed request. From this, the target (or steady state) variator ratio (which, in this example, may be considered to be the effective control variable) may be fed into stage 414.

Typically, it is undesirable to apply a step or near-step change in control variable request for the reasons described earlier (because the net engine torque profile would not be smooth and progressive, and excessive inertial torque and jerk may be apparent at the crank). Instead, the target variator ratio request is modified to determine an instantaneous variator ratio target with a rate of change such that the inertial torque applied to the crank does not cause the total supercharger load (as referred to the crank) to exceed a threshold. This is preferably achieved by approaching the steady state variator ratio target asymptotically. Stage 414 thus issues a variator ratio and rate of change of variator ratio signal that are suitably modified. In this example, the signal is also modified at 416 such that it falls within saturation limits that are dependent upon a range of instantaneous operational parameters 420. These parameters may include (potentially amongst others):

the variator ratio (derived from measured variator input and output speeds), to ensure that the request does not cause the variator to attempt to adopt a ratio outside of its operating range;

the output speed of the variator, to ensure that the request does not cause the variator to attempt to exceed its maximum output speed;

the supercharger speed, to ensure that the request does not cause the supercharger to attempt to exceed its maximum operational speed;

the power and torque to be transmitted by the variator (which can be derived from the mass airflow request and the supercharger air pressure request) to ensure that these do not exceed maximum operational values.

The instantaneous target is then used to determine the control means stage 422, which has an output that is a linear position request supplied to drive the actuator 424 that directly controls the variator ratio. It is understood that the linear position is a signal that relates to variator ratio. This stage can either be open-loop if an actuator with a known linear position is used such as a stepper motor, or closed-loop if a non-positional actuator is used; the present embodiment adopts the latter arrangement. The closed-loop control stage 422 also has an error input that is the difference between the linear position request appearing at its output and the measured linear position 426.

Further inputs to the closed-loop control stage 422 include the measured mass airflow 430 and the measured supercharger pressure ratio 432, which are combined at 434 to derive a signal indicative of the variator torque. These feed a steady state value for variator output torque into the final limiting stage 440.

The function of the final limiting stage 440 is to further limit the variator ratio, and the rate of change of variator ratio if required such that the inertial torques referred to the crank are not excessive, and that various variator and supercharger limits are not violated. This includes preventing the variator from exceeding its allowable torque envelope. In this embodiment, in order to ensure that the allowable variator output torque ('maximum variator torque' in the expression below) limit is not exceeded, the condition whereby variator rate of change of output speed (that is, supercharger speed) is less than the maximum permissible value (that is to say, $\dot{\omega}_c < \dot{\omega}_{v_{max}}$) can be satisfied. The value of $\dot{\omega}_{v_{max}}$ is calculated in 438 using the final request to the linear actuator, whereby $$\dot{\omega}_{v_{max}} = \frac{\text{Maximum variator torque} - \text{Instantaneous measured variator torque}}{\text{Inertia at the output of the variator}}.$$

This inertial torque value is combined with the steady state torque value in the limiting stage 440, and variator ratio and rate of change of ratio modified suitably.

Similarly, the variator ratio itself may be limited in 440 such that the maximum supercharger or compressor speed is not exceeded.

Figure 17:
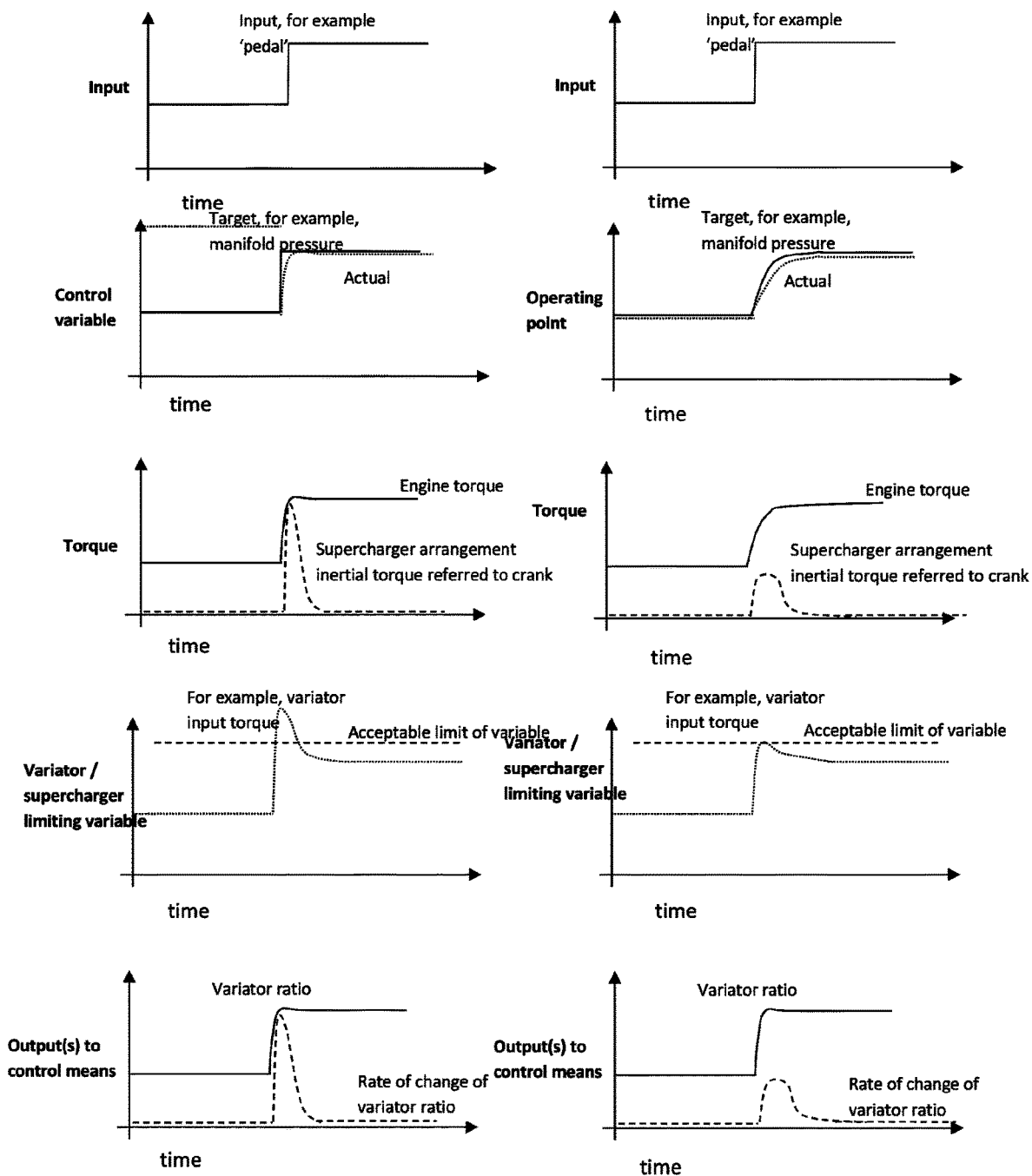
FIG. 17 is a series of graphs that illustrate the effect of applying compensating limitations within a control system of an embodiment of the invention (the left hand graphs illustrate the system without compensation whilst the right hand graphs illustrate the system response with compensation applied).

FIG. 17 illustrates the action of the control system to a sudden change in an input variable, such as a driver rapidly depressing the accelerator pedal. The left-hand column of graphs illustrates such responses in the without regard to saturation limits, while the right-hand column shows the effect of saturation limits, as discussed above.

The invention claimed is:

1. A supercharging arrangement for an internal combustion engine comprising:
   a supercharger having a rotational drive input;
   a transmission having a rotational drive input to receive drive from the internal combustion engine, and a rotational drive output connected to the input of the supercharger, wherein the transmission includes a variator operatively connected between the rotational drive input and the rotational drive output of the transmission, which the variator has an output that is driven at an operating ratio from an input, wherein the variator is of a rolling race type and incorporates at least one rolling element clamped between two races;

a control means having a slider for adjusting one or both of the operating ratio and a rate of change of the operating ratio of the variator; and a control system that operates to cause the engine to adopt a target operating point that is indicated by a state of an input to the control system, the control system being operative to set the operating ratio of the variator via the control means, wherein to set the operating ratio of the variator, the control system is operative to determine a target variator ratio based on the input and modify the target variator ratio to determine a modified target variator ratio.

2. The supercharging arrangement according to claim 1 in which the input to the control system may be one or more of an input determined by a person, an automated vehicle speed controller, an autopilot, a vehicle stability control system, an engine speed governor, a main drive transmission, an energy storage system, an energy recovery system, an auxiliary driven device and a power take-off device.

3. The supercharging arrangement according to claim 1 in which the control system is operative to regulate an inertial torque of the supercharging arrangement that is referred to the drive input such that it is a fixed or variable proportion of an engine output torque.

4. The supercharging arrangement according to claim 1 in which the control system is operative to regulate an inertial torque of the supercharging arrangement such that a torque such sum of said inertial torque and a steady state supercharging arrangement torque, when said torque sum is referred to the drive input, is a fixed or variable proportion of an engine output torque.

5. The supercharging arrangement according to claim 1 in which the control system operates to regulate changes in an inertial torque of the supercharging arrangement that is referred to a crankshaft of the internal combustion engine such that a rate of change of said torque is such that jerk does not exceed a pre-determined threshold.

6. The supercharging arrangement according to claim 1 in which the control system operates to adjust the operating ratio of the variator such that one or more operational limits of one or both of the supercharger and variator are not violated, wherein the operational limit of the supercharger is one or more of a maximum speed, a surge limit, a choke limit, a pressure ratio limit, a boost pressure limit and a drive torque limit.

7. The supercharging arrangement according to claim 6 in which the operational variator limit is one or more of a clamp load, input torque, output torque, input speed, output speed, variator ratio, reaction torque, input power, output power and contact fraction limits.

8. The supercharging arrangement according to claim 6, in which the control system utilizes one or both of an engine speed and an engine acceleration signal in order to prevent violation of one or both of the variator and supercharger limits, in which the engine acceleration signal is determined from one or both of a filtered derivative of an engine speed measurement and an estimated engine acceleration based on an engine torque, supercharger arrangement torque referred to a crank, transmission ratio, powertrain inertia, vehicle inertia and gradient.

9. The supercharging arrangement according to claim 1 in which the variator comprises:

an input surface and an output surface, the input and output surfaces being coaxially mounted for rotation about a variator axis, and a toroidal cavity being defined between the input and output surfaces;

the at least one of rolling elements disposed between and being in driving engagement with the input and the output surfaces at respective contact regions, each of the rolling elements being mounted on a carriage assembly for rotation about a rolling axis, each of the rolling elements being free to pivot about a tilt axis, the tilt axis passing through each of the rolling elements perpendicular to the rolling axis, and intersecting the rolling axis at a roller center, whereby a change in the tilt angle causes a change in the variator ratio being the ratio of rotational speeds of the input and output surfaces.

10. The supercharging arrangement according to claim 9 in which each of the carriage assembly mounted to one of the roller elements can cause pivotal movement, which the pivotal movement is about a pitch axis that results in a change of a pitch angle of the rolling element associated with each of the carriage assembly, the pitch axis passing through the roller center and through the contact regions; and the variator further comprising a control member operative to cause each carriage assembly to undertake the pivotal movement thereby changing the pitch angle, so urging the plurality of rolling elements to pivot about their tilt axes and thereby provide a change in the operating ratio of the variator.

11. The supercharging arrangement according to claim 1 in which the at least one of multiple rolling elements experience a positional input that displaces them such that the races steer said rolling elements as they rotate such that they adopt a new orientation whereby the relative positions of the rolling element contacts with the races are commensurate with the positional input, in which the orientations of the rolling elements determine the variator ratio.

12. The supercharging arrangement according to claim 1 in which the control means is operative to cause an actuator to adjust one or both of the operating ratio of the variator and the rate of change of the operating ratio of the variator, in which the actuator is one of a stepper motor, a DC motor, a torque motor or a hydraulic cylinder.

13. A supercharging arrangement for an internal combustion engine comprising:

a supercharger having a rotational drive input;

a transmission having a rotational drive input to receive drive from the internal combustion engine, and a rotational drive output connected to the input of the supercharger, wherein the transmission includes a variator operatively connected between the rotational drive input and the rotational drive output of the transmission, which the variator has an output that is driven at an operating ratio from an input, wherein the variator is of a rolling race type and incorporates at least one rolling element clamped between two races;

a control means having a slider for adjusting one or both of the operating ratio and a rate of change of the operating ratio of the variator; and a control system that operates to cause the engine to adopt a target operating point that is indicated by a state of an input to the control system, the control system being operative to set one or both of the operating ratio of the variator and the rate of change of the operating ratio of the variator via the control means, wherein the control system is operative to cause the target operating point to be satisfied by adjustment of a control variable that is based on a calculation of air pressure at an outlet of the supercharger.

14. The supercharging arrangement according to claim 13 in which the control system acts to regulate an inertial torque of the supercharging arrangement that is referred to the drive input such that one or both of the engine operating condition and the control variable are approached asymptotically.

15. The supercharging arrangement according to claim 13 in which the control variable is representative of an instantaneous state of operation of the supercharger of the supercharging arrangement.

16. The supercharging arrangement according to claim 13 wherein an inertial torque of the supercharging arrangement that is referred to the drive input is determined as a function of an error of the control variable.

17. The supercharging arrangement according to claim 16 wherein the error of the control variable is calculated as a difference between the target value of the control variable and a current value of the control variable, in which said function is adapted to implement a proportional or indirect proportional control, wherein said function that is adapted to implement proportional control comprises terms that may be fixed or variable, wherein said terms vary as a function of the error of the control variable.

18. The supercharging arrangement according to claim 16 in which said function is also adapted to implement a closed-loop correction of one or both of the target value of the control variable and the engine operating point, wherein said function comprises one or more of a proportional, an indirectly proportional, an integral and a derivative term.

19. A front end auxiliary driven device (FEAD) comprising:
   a rotational drive input of the FEAD;
   a transmission having a rotational drive input to receive drive from an internal combustion engine, and a rotational drive output connected to the rotational drive input of the FEAD, wherein the transmission includes a variator operatively connected between the input and output of the transmission, which the variator has an output that is driven at an operating ratio from an input, wherein the variator is of a rolling race type and incorporates at least one rolling element clamped between two races;
   control means having a slider for adjusting one or both of the operating ratio and a rate of change of the operating ratio of the variator;
   a control system that operates to cause an engine to adopt an operating point that is indicated by the state of an input to the system, the control system being operative to set the operating ratio of the variator via the control means, wherein to set the operating ratio of the variator, the control system is operative to determine a target variator ratio based on the input, modify the target variator ratio to determine a modified target variator ratio, and modify the modified target variator ratio to determine an instantaneous target variator ratio.

\* \* \* \* \*